US012575593B2

(12) United States Patent
Cook et al.

(10) Patent No.: US 12,575,593 B2
(45) Date of Patent: Mar. 17, 2026

(54) TEXTURE MODIFIED FOOD PRODUCT

(71) Applicant: I Cook Catering Services Pty Ltd, Dandenong South (AU)

(72) Inventors: Ian William Cook, Cleveland (AU); Michael Andrew Cook, Blackburn (AU)

(73) Assignee: I Cook Catering Services Pty Ltd (AU)

( * ) Notice: Subject to any disclaimer, the term of this patent is extended or adjusted under 35 U.S.C. 154(b) by 472 days.

(21) Appl. No.: 17/593,230

(22) PCT Filed: Mar. 12, 2020

(86) PCT No.: PCT/AU2020/050230

§ 371 (c)(1),
(2) Date: Sep. 13, 2021

(87) PCT Pub. No.: WO2020/181331

PCT Pub. Date: Sep. 17, 2020

(65) Prior Publication Data

US 2022/0142222 A1    May 12, 2022

(30) Foreign Application Priority Data

Mar. 14, 2019    (AU) ................................. 2019201778

(51) Int. Cl.
*A23P 30/10*        (2016.01)
*A21D 13/80*        (2017.01)
(Continued)

(52) U.S. Cl.
CPC .............. *A23P 30/10* (2016.08); *A21D 13/80* (2017.01); *A21D 17/002* (2013.01); *A23L 5/55* (2016.08);
(Continued)

(58) Field of Classification Search
CPC .. A23P 30/10; A23L 29/27; A23L 5/55; A23L 7/143; A23L 33/40; A23L 7/109;
(Continued)

(56) References Cited

U.S. PATENT DOCUMENTS 4,200,481 A    4/1980  Faller
4,622,234 A    11/1986  Okada
(Continued)

FOREIGN PATENT DOCUMENTS

CN        102188007 A    9/2011
CN        104605382 A    5/2015
(Continued)

OTHER PUBLICATIONS

Liu Z, Bhandari B, Prakash S, Zhang M, Creation of internal structure of mashed potato construct by 3D printing and its textural properties, Sep. 1, 2018, Food Research International, 111 pp. 534-543. (Year: 2018).*
(Continued)

*Primary Examiner* — Michele L Jacobson
(74) *Attorney, Agent, or Firm* — Stevens & Showalter LLP

(57) ABSTRACT

The invention is directed broadly to a method of preparing a texture modified starch-based food product, comprising the steps: (a) dehydrating a starch-based food to remove excess water; (b) grinding the dehydrated starch-based food to form a fine powder; (c) adding a carrier to coat the fine powder; (d) rehydrating the coated powder to form a paste; and (e) forming the paste into the texture modified starch-based food product shaped and textured to a generic serve of the starch-based food selected to form the paste.

22 Claims, 19 Drawing Sheets

- Cooking the starch-based food product, if required.
- Steam, boil, microwave, blanch, etc.

- Dehydrating the cooked or uncooked starch-based product.

- Grinding the dehydrated starch-based product into a fine powder.
- Adding a carrier, such as vegetable oil to coat the powder particles.
- Adding cold water to the coated power to form a paste.

- Modify the viscosity of the paste if required to achieve desired consistency.
- Add additives and/or flavorings, if required.

- Vacuum forming a liner within a mould.
- Placing the paste in the lined mould and forming the texture modified food product.

- Sealing the portion/s in a package and pasteurising (hot or cold).
- Freeze package for storage and/or distribution.

(51) Int. Cl.

| | |
|---|---|
| *A21D 17/00* | (2006.01) |
| *A23L 5/00* | (2016.01) |
| *A23L 7/109* | (2016.01) |
| *A23L 7/143* | (2016.01) |
| *A23L 19/12* | (2016.01) |
| *A23L 29/269* | (2016.01) |
| *A23L 33/00* | (2016.01) |
| *B65B 11/52* | (2006.01) |
| *B65B 25/00* | (2006.01) |
| *B65B 47/10* | (2006.01) |

(52) U.S. Cl.
CPC .............. *A23L 7/109* (2016.08); *A23L 7/143* (2016.08); *A23L 19/13* (2016.08); *A23L 29/27* (2016.08); *A23L 33/40* (2016.08); *B65B 11/52* (2013.01); *B65B 25/001* (2013.01); *B65B 47/10* (2013.01); *A23V 2002/00* (2013.01)

(58) Field of Classification Search
CPC ....... A23L 19/15; A21D 17/002; B65B 11/52; B65B 25/001; A23V 2002/00
See application file for complete search history.

(56) References Cited

U.S. PATENT DOCUMENTS

| | | | | |
|---|---|---|---|---|
| 4,720,391 | A | | 1/1988 | Kawana |
| 5,013,568 | A | | 5/1991 | Lorier et al. |
| 5,229,157 | A | * | 7/1993 | Birch ...................... A23L 11/05 |
| | | | | 426/243 |
| 5,322,705 | A | | 6/1994 | Heeps |
| 5,928,690 | A | | 7/1999 | Wiebe |
| 6,676,986 | B1 | | 1/2004 | Huttenbauer |
| 6,770,318 | B1 | | 8/2004 | Roussell et al. |
| 6,814,905 | B1 | | 11/2004 | Dalgewicz |
| 2004/0156960 | A1 | * | 8/2004 | Villota ..................... A23B 7/10 |
| | | | | 426/325 |
| 2005/0037168 | A1 | | 2/2005 | Dalgewicz |
| 2006/0034979 | A1 | | 2/2006 | Stenbeck et al. |
| 2009/0047390 | A1 | | 2/2009 | Cassel et al. |
| 2010/0266743 | A1 | | 10/2010 | Chen et al. |
| 2012/0115964 | A1 | | 5/2012 | Foster et al. |
| 2013/0142917 | A1 | * | 6/2013 | Sepehr .................... A23L 3/015 |
| | | | | 426/123 |
| 2014/0287521 | A1 | | 9/2014 | Bender |
| 2016/0227811 | A1 | * | 8/2016 | Jones .................... A23G 1/226 |
| 2017/0088298 | A1 | | 3/2017 | Mclenithan et al. |
| 2017/0107048 | A1 | | 4/2017 | Adam |
| 2017/0347694 | A1 | | 12/2017 | Yamamoto |
| 2018/0086535 | A1 | | 3/2018 | Schoenfellinger et al. |
| 2018/0317536 | A1 | | 11/2018 | Nakajima et al. |
| 2018/0325154 | A1 | | 11/2018 | Wong et al. |

FOREIGN PATENT DOCUMENTS

| | | | | | |
|---|---|---|---|---|---|
| CN | 105011191 | A | | 11/2015 | |
| DE | 102015003740 | A1 | | 9/2016 | |
| EP | 2695524 | A1 | | 2/2014 | |
| GB | 2386311 | A | * | 9/2003 | ........... A23L 1/2005 |
| JP | H11075769 | A | | 3/1999 | |
| JP | 2005269947 | A | | 10/2005 | |
| JP | 4311940 | B2 | | 8/2009 | |
| JP | 2017104055 | A | | 6/2017 | |
| KR | 101444609 | B1 | * | 9/2014 | |
| PT | 1841332 | E | * | 10/2009 | |
| WO | 9908545 | A1 | | 2/1999 | |
| WO | WO-03055334 | A1 | * | 7/2003 | ............... A21D 2/00 |
| WO | WO-2014131123 | A1 | * | 9/2014 | ............ A23L 13/67 |
| WO | 2016150960 | A1 | | 9/2016 | |
| WO | 2017048190 | A1 | | 3/2017 | |
| WO | 2019200435 | A1 | | 10/2019 | |
| WO | 2019227138 | A1 | | 12/2019 | |

OTHER PUBLICATIONS

The Seasoned Advice, Whole eggs versus folding in egg whites, 2014, https://cooking.stackexchange.com/questions/51564/whole-eggs-versus-folding-in-egg-whites. (Year: 2014).*

Rattray D, How to Fold Egg Whites or Whipped Cream Into Batter, 2018, The Spruce Eats, https://www.thespruceeats.com/how-to-fold-egg-whites-into-batter-3057584. (Year: 2018).*

Emblem (2012) "Packaging Technology—Fundamentals, Materials and Processes." Elsevier. Retrieved Nov. 12, 2024 from https://app.knovel.com/hotlink/toc/id:kpPTFMP001/packaging-technology/packaging-technology (Year: 2012).*

Fernandez "Quality of mashed potatoes: effect of adding blends of kappa-carrageenan and xanthan gum" Eur Food Res Technol 229, 205-222 (2009). Retrieved online Nov. 12, 2024 https://doi.org/10.1007/s00217-009-1044-x. (Year: 2009).*

Fernandez.*

Davis.*

Emblem.*

Davis "Herbed Potato Souffle" https://www.foodandwine.com/recipes/herbed-potato-souffle, published online May 23, 2017, retrieved electronically Nov. 12, 2024 (Year: 2017).*

R. Ananthakrishnan; Preliminary Search Report and Opinion; Australian Application No. 2018203879; Jul. 11, 2018; Australian Patent Office; Woden, ACT, Australia.

Luke Burow; International Search Report and Written Opinion; International Application No. PCT/AU2019/050507; Jul. 30, 2019; Australian Patent Office; Woden, ACT, Australia.

"Tasty food. Safer food. Delicious recipes for people with swallowing difficulties"; Published Mar. 4, 2011; retrieved from http://www.dysphagia.ie/uploads/documents/FINAL_Nutilis_recipe_book_printed_04.03.11.pdf on Jun. 27, 2019.

Luke Burow; International Search Report and Written Opinion; International Application No. PCT/AU2019/050348; Jul. 29, 2019; Australian Patent Office; Woden, ACT, Australia.

Merriam, Andrew E.; Non-Final Office Action dated Oct. 5, 2023; U.S. Appl. No. 17/059,908; United States Patent and Trademark Office; Alexandria, Virginia.

Reinhard Diller; Extended European Search Report; European U.S. Appl. No. 19/788,582; Dec. 22, 2021; European Patent Office; The Hague.

Byran Kim; Office Action dated Feb. 2, 2023; U.S. Appl. No. 17/049,181; United States Patent and Trademark Office; Alexandria, Virginia.

Blixer NPL; published Oct. 8, 2013; https://www.youtube.com/watch?v=V7HdzwThWZ8 (Year: 2013).

Gaiser, Markus; Supplementary European Search Report; European Application No. 20768956; Aug. 12, 2022; Munich, Germany.

Kim, Bryan; Final Office Action dated Nov. 15, 2023; U.S. Appl. No. 17/049,181; United States Patent and Trademark Office; Alexandria, Virginia.

Zhenbin Liu et al., "Creation of internal structure of mashed potato construct by 3D printing and its textural properties", Food Research International, 2018, vol. 111, pp. 534-543X; abstract; introduction.

David Oliver et al., "Palliative Care in Amyotrophic Lateral Sclerosis: From Diagnosis to Bereavement", Oxford University Press, Oxford, Third Edition, 2014; p. 8, section labeled (p. 98), paragraphs 1-3.

Edgar Torres; International Search Report and Written Opinion; International Application No. PCT/AU2020/050230; May 11, 2020; Australian Patent Office; Woden, ACT, Australia.

"Nutilis powder Data sheet—A food and fluid thickener with amylase resistant features for the dietary management of dysphagia"; Nutricia; pp. 1-2; May 2016; Retrieved from the internet at URL:https://www.nutricia.co.za/upload/product%20pdfs/Nutilis%20Powder%20Fact%20Sheet%20SA%20-%20FC.pdf.

S. Alevisopoulos; Extended European Search Report; European Application No. 19811689; Feb. 25, 2022; Munich, Germany.

Merriam, Andrew E.; Final Office Action dated Apr. 19, 2024; U.S. Appl. No. 17/059,908; United States Patent and Trademark Office; Alexandria, Virginia.

(56) References Cited

OTHER PUBLICATIONS

Kim, Bryan; Non-Final Office Action dated Mar. 28, 2024; U.S. Appl. No. 17/049,181; United States Patent and Trademark Office; Alexandria, Virginia.

Merriam, Andrew E.; Non-Final Office Action dated Mar. 18, 2025; U.S. Appl. No. 17/059,908; United States Patent and Trademark Office; Alexandria, Virginia.

Kim, Bryan; Final Office Action dated Jan. 13, 2025; U.S. Appl. No. 17/049,181; United States Patent and Trademark Office; Alexandria, Virginia.

Merriam, Andrew E.; Final Office Action dated Nov. 28, 2025; U.S. Appl. No. 17/059,908; United States Patent and Trademark Office; Alexandria, Virginia.

"How to keep breading on the meat", downloaded on Nov. 17, 2025 from https://forums. egullet.org/topic/53598-how-to-keep-breading-on-the-meat/ (Year: 2004).

Lam CJY, Phua QQ, Guo EY and Sia IKM; "Impact of a moulded pureed diet on taste, appearance, recognisability, and overall liking among patients in an acute hospital"; Frontiers in Nutrition; frontiersin. org; Sep. 19, 2023.

Ball J and Walker P; "Focus on Puree: Ensuring Shaped, Gelled or Moulded Purees meets the requirements for IDDSI Level 4 Puree"; IDDSI Special Feature; Sep. 2020.

Wu XS, Miles A, and Braakhuis A; "Nutritional Intake and Meal Composition of Patients Consuming Texture Modified Diets and Thickened Fluids: A Systematic Review and Meta-Analysis"; www. mdpi.com/journal/healthcare; Dec. 21, 2020.

Chen L, Hemsley B, and Debono D; "The Impact of Food-Shaping Techniques on Nutrition, Mealtime Experiences, and Quality of Life for Older Adults in Aged Care Settings: A Systematic Review"; Current Nutrition Reports; https://doi.org/10.1007/s13668-023-00493-w; Sep. 4, 2023.

Final Office Action dated Dec. 30, 2025; U.S. Appl. No. 17/049,181; United States Patent and Trademark Office; Alexandria, Virginia.

Kim, Bryan; Non-Final Office Action dated Jun. 10, 2025; U.S. Appl. No. 17/049,181; United States Patent and Trademark Office; Alexandria, Virginia.

* cited by examiner

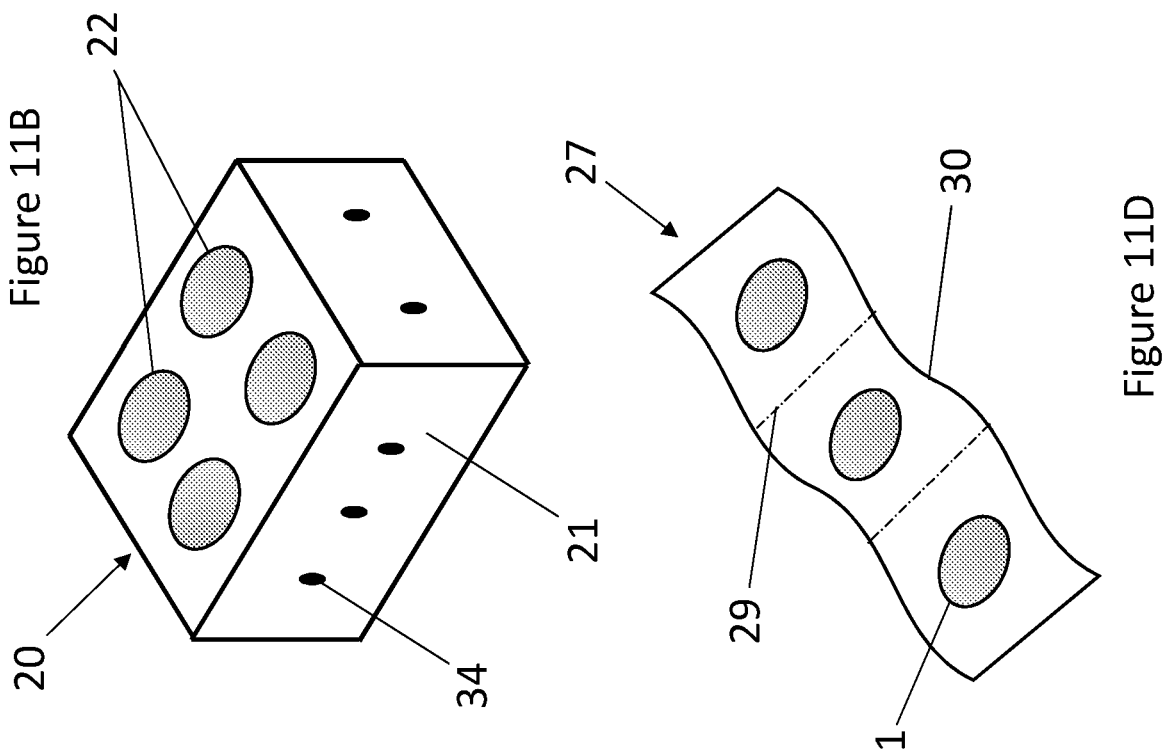
Figure 11B
Figure 11D
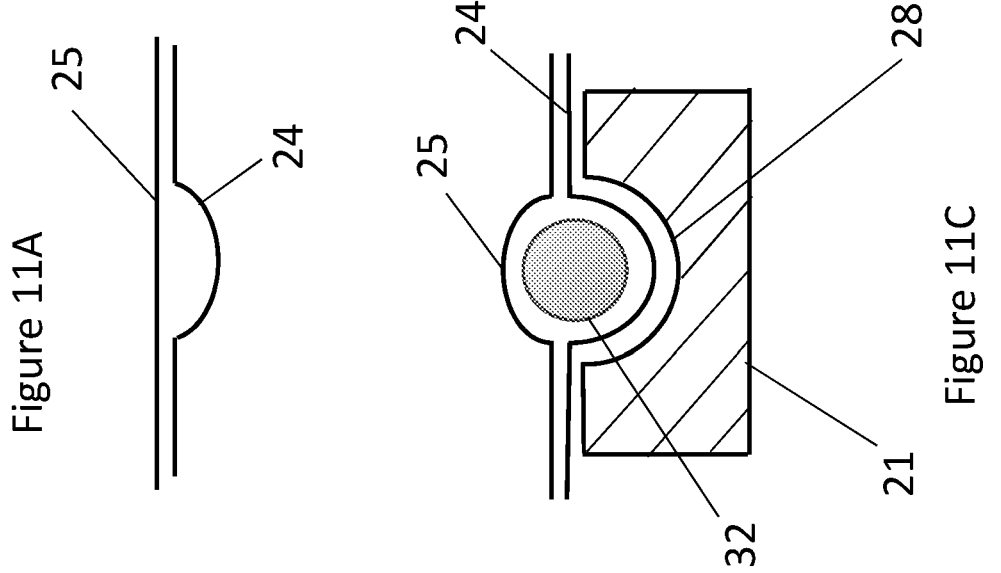
Figure 11A
Figure 11C

Figure 15C

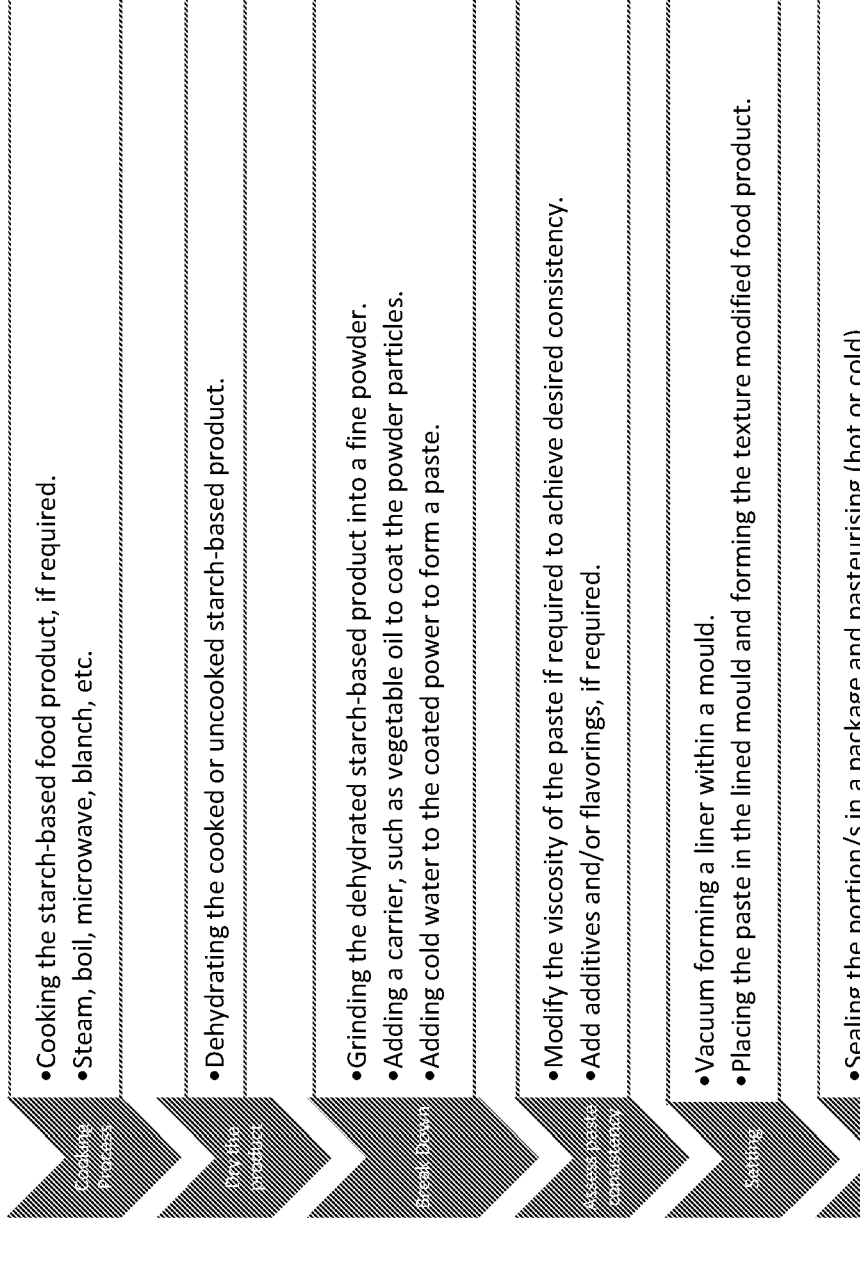

- Cooking the starch-based food product, if required.
- Steam, boil, microwave, blanch, etc.

- Dehydrating the cooked or uncooked starch-based product.

- Grinding the dehydrated starch-based product into a fine powder.
- Adding a carrier, such as vegetable oil to coat the powder particles.
- Adding cold water to the coated power to form a paste.

- Modify the viscosity of the paste if required to achieve desired consistency.
- Add additives and/or flavorings, if required.

- Vacuum forming a liner within a mould.
- Placing the paste in the lined mould and forming the texture modified food product.

- Sealing the portion/s in a package and pasteurising (hot or cold).
- Freeze package for storage and/or distribution.

Figure 16

TEXTURE MODIFIED FOOD PRODUCT

TECHNICAL FIELD

The invention relates to the field of texture modified foods, also referred to as puree foods. Specifically, the invention relates to a method of preparing a selected starch or starch-based product processed for consumption and formed to resemble a serving of the selected starch-based product. The invention also relates to a method of processing, forming and packaging the texture modified starch-based product.

BACKGROUND

For many people, whether through age, dental condition, illness or accident, the act of swallowing becomes laboured, painful or even impossible. The loss of the ability to swallow is given the medical name dysphagia and refers to the specific medical condition where the passage of solids or liquids from the mouth to the stomach becomes difficult.

The effects of dysphagia can be physical, where the dysphagic individual is susceptible to pulmonary aspiration and possible aspiration pneumonia brought about by food going into the lungs and not into the oesophagus. In some cases, this condition can be managed with texture modified foods "tmf". However, there is a delicate balance to be found between puree foods which are not so runny as to leak into the larynx and trachea but conversely not so solid to require chewing or manipulation and not sticky so as to become adhered to the palate. This balance is further complicated when foods are susceptible to heat, as the heat of the mouth can rapidly decrease the viscosity of certain foods.

Often overlooked is the psychological effect of dysphagia. A dysphagic individual may be nutritionally stable on a tmf diet but no longer feels comfortable to eat in front of others. Furthermore, a tmf option is seldom available at restaurants, such that a dysphagic individual cannot elect to eat at a restaurant with friends and family and thus become isolated from many of the social aspects of dining.

Typically, tmf is prepared as a puree by boiling or steaming a starch-based product, such as pasta or fish until it is fully cooked and very soft, so that it can be blended with sufficient liquid (stock or cooking water), to form a smooth paste. The finished puree is then plated in measured dome-shaped scoops. Made in this traditional manner, the product lacks aesthetic appeal due to the monochrome colour of the puree which is typically faded and pale as a result of the heating and blending processes. The puree is also of poor nutrient density, which happens because of the dilution effect of adding the stock or cooking water required to achieve the puree end product. Diluting and then thickening a starch-based product to form a puree in this manner may also bind the fats of the product into the puree thereby losing the appearance of the rice or pasta.

The present invention was conceived with these shortcomings in mind.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

SUMMARY OF THE INVENTION

The invention is directed broadly to a method of preparing a texture modified starch-based food product for consumption by a dysphagic consumer, comprising the steps: (a) dehydrating a starch-based food to remove excess water; (b) grinding the dehydrated starch-based food to form a fine powder; (c) adding a carrier to coat the fine powder; (d) rehydrating the coated powder to form a paste; and (e) forming the paste into the texture modified starch-based food product shaped and textured to a generic serve of the starch-based food selected to form the paste.

The step (c) forming the paste may provide a smooth paste with a slippery consistency not a sticky consistency.

In some embodiments, the paste may be formed in a mould. The mould may be configured to mould the paste into a serving shaped portion. In some embodiments the starch-based paste may be moulded to closely resemble the selected starch-based food.

The method described herein achieves a realistic looking finished product as the selected starch-based product is dehydrated then rehydrated and finishes in a relatively none diluted form.

The step of grinding the dehydrated starch-based food is performed with a grinding mill or a bowl cutter.

The starch-based product may be cooked prior to dehydrating in step (a).

In the step of cooking the starch-based, the cooked starch-based product may be cooked until just cooked, Al dente. The temperature and duration of the cooking process may depend on the starch-based product to be cooked, to ensure that the cooking process has sufficiently killed bacteria on the starch-based product and achieve the desired flavour profile. Typically, the starch-based products should be cooked as it would be if it were to be consumed.

The term "cooked" is understood herein in reference the US Food and Drug Administration (FDA) Time-Temperature "Kill Step" Graph which defines that a product reaches a core temperature of above 55 degrees Celsius and holds this temperature for a corresponding period of time to achieve a cooked status.

The ratio of weight of the fine powder to the weight of the carrier is about 10:3. The carrier may be an oil, for example a vegetable oil, a canola oil, a sesame oil, a sun-flower oil or an olive oil.

The method may further comprise the step of assessing the consistency of the paste. Where necessary, the consistency of the paste may be adjusted.

The step of moulding the paste to form the texture modified food product may comprise setting the paste in a mould.

The method facilitates the production of realistic food portion sizes that further reflect a realistic looking starch-based product serve. The method provides texture modified food products that closely resemble a serving of the original starch-based product in form, exterior texture, taste and nutritional content. The texture modified food products provided promote the appetite of the consumer and reinstate a modicum of normalcy and dignity to meal times and dining occasions.

The step of chopping the cooked starch-based product may be performed with a shear-blade cutter or a bowl cutter or grinding mill.

The term "grinding" as used herein is intended to describe broadly the process of physically breaking down the cooked starch-based product into small enough particles to form a paste, as such it includes chopping, cutting, slicing, milling, and dicing etc. The particles can range anywhere in size from 5-40 microns, and the exact particle size will vary for different starch-based products.

The step of assessing the consistency of the paste additionally may involve adjusting the mixture to increase the viscosity of the paste to meet a predetermined standard.

The method may further comprise the step of introducing an additive into the mixture prior to setting the paste in the mould. The additive may be selected from at least one of: Xanthan gum; Vegetable Gum; Carrageenan; Agar-Agar; Guar Gum; Gum Arabic; Gelatine; agglomerated modified potato starch (AMPS); natural vegetable fibre; bamboo fibre; mirin; dashi; starch; salt and pepper.

The ability to hold shape and texture of the final texture modified food product is advantageous through the (i) transportation, (ii) unpackaging, (iii) plating and (iv) heating processes. If any of these processes (i)-(iv) result in excessive damage to the shape and texture of the product when plated before the consumer, the resemblance to non-textured food could be lost or diminished along with the appeal, and opportunity to positively affect the consumer's appetite.

The method may comprise the step of introducing the paste into the mould while warm, prior to setting the paste in the mould. The method may comprise the step of introducing the paste into the mould while cold, prior to setting the paste in the mould.

The mould may be coated or dusted with flavourings or colouring to enhance at least one of the flavour profile, the colour, the aroma and the aesthetic of the finished texture modified food product.

The method may further comprise the step of integrating the mould with a thermoforming machine.

The method may maintain the mould at a temperature below 1 degree Celsius to set the texture modified food product.

The mould may provide a recess shaped and/or textured to a generic serving form of the starch-based product selected to form the paste. The mould may provide a plurality of recesses shaped and/or textured to the generic serving form of the starch-based product selected to make the paste. Each of the plurality of shaped recesses may have an equal volume.

The method may further comprise the step of lining the mould with a first layer of packaging material prior to introducing the paste therein.

The mould may be configured as a die. The die may provide at least one venting hole therein, to draw air from the recesses shape into the die. The die may be connectable with a vacuum forming machine or with a thermo-forming machine. In some embodiments the paste is moulded using a vacuum moulding or by blow moulding machine. A greater level of detail can be achieved in the moulded product if a plug assisted method is employed with the vacuum forming process.

The method may include the step of vacuum assisting the drawing of the first layer of packaging material into the mould prior to receiving the paste.

The venting holes in the die require redesign and modification to support the drawing of the lining material into complex curves and recesses of a realistic mould shape. This requires detailed analysis of the form to be created and significant work to achieve an even draw across the surface of the mould.

The method may further comprise the step of operatively engaging the mould with a thermo-forming machine. The method may further comprise the step of disposing a second layer of packaging material over the mould after the paste has been received therein and fusing the second layer with the first layer of packaging material thereby forming a sealed pouch around the moulded texture modified food product.

The texture modified food products can be formed in individual portions in full three-dimensional forms or in flat-bottom shapes, that are easily retained on a plate and cannot roll about.

The lining material protects the moulded texture modified food product thereby reducing contamination risk. The lining material also increases production rates achievable from a single set of moulds.

Without the lining, each filling, freezing and releasing of the mould would require a full clean, sterilisation and drying step before another batch of the product could be formed. The sterilisation step would be further complicated with the plurality of air vents running from the mould into the die.

The die of the present invention is lined with a sterile film to form a new mould each time before receiving the paste which is formed and frozen, then released for the next batch to begin. The finished texture modified food product is instantly sealed into the packaging reducing additional handling steps thereby reducing contamination risk. The next time the product is contacted is when it is released from the package ready for imminent consumption.

The method may further comprise the step of air evacuating the sealed pouch prior to sealing. This can reduce the possibility of freezer burn on the finished texture modified food products. This step provides advantages in increasing the shelf-life of the finished product.

The method may further comprise the step of back-flushing the pouch with carbon dioxide and nitrogen to remove suspended oxygen from the moulded texture modified food product prior to sealing the pouch.

The method may further comprise the step of hot pasteurising the sealed pouch to increase usable shelf life of the packaged product. The method may further comprise the step of cold pasteurising the sealed pouch to increase usable shelf life of the packaged product.

The method may further comprise the step of freezing the sealed pouch for distribution.

In a second aspect, the invention provides a texture modified food product made by the method described herein.

In one aspect, the invention provides a texture modified food product for consumption by a dysphagic consumer, comprising; a paste formed from a starch-based product, the paste retaining the flavour of the selected starch-based product; and an additive selected from a group comprising: Xanthan gum; Carrageenan; Agar-Agar; Guar Gum; Gum Arabic; Gelatine; salt; and pepper, wherein the modified food product is shaped and textured to a generic serve of the starch-based product selected to form the paste.

The paste may be made from any one of the following: bread, rice, pasta, noodles, pastry, rice crackers, and potato and any other starch-based food consumed by people regardless of cultural preference.

The above list of starch-based foods are merely examples and most starch-based food products can be processed in the above described manner. This provides the ability to present a restaurant quality meal in terms of presentation and flavour that promotes social inclusion.

The texture modified food product may be adjusted in portion size to suit a consumer's appetite.

The texture modified food product may be pre-planned and plated, prior to heating for consumption.

The texture modified food product may be plated frozen.

The texture modified food product may retain its shape through a thawing or heating process.

The texture modified food product may be reheated during a meal without loss of shape or colour.

A plurality of texture modified food products made from different starch-based products may be combined on a plate with texture modified vegetable and protein products to present the consumer with a full texture modified meal. The individual texture modified food products on the plate may remain separate. The separation of individual texture modified products on a plate may be maintained through a thawing process. The separation of individual texture modified products on a plate may be maintained through a heating process.

Individual texture modified food products are produced to a single taste profile. However, the individual components can then be plated to form a meal, a casserole or a stir fry, that brings these individual elements together but still provides for individual consumption. A consumer can eat servings of rice, pasta, bread, mashed potato, beef and vegetable products at their leisure and not be forced to confront or consume all meal components blended together in single serving or discoloured pulp.

The single prepared servings of each product provide ultimate flexibility on portion size and nutritional content of a given meal, to comply with recommended serving sizes from a dietitian. As the texture modified food products do not require any cutting or additional processing there is little waste and a consistent presentation of the food products.

Various features, aspects, and advantages of the invention will become more apparent from the following description of embodiments of the invention, along with the accompanying drawings in which like numerals represent like components.

BRIEF DESCRIPTION OF THE DRAWINGS

Embodiments of the invention are illustrated by way of example, and not by way of limitation, with reference to the accompanying drawings, of which:

FIG. 11A is an end view of a thermoformed package of a texture modified starch product having a flat-bottom;

FIG. 11B is a perspective view of a die for forming a plurality of flat bottomed starch products simultaneously, in the form of bread rolls;

FIG. 11C is a schematic view of a texture modified paste being distributed into a moulding recess of FIG. 9, illustrating two layers of packaging material: a first inside the moulding recess and a second laid across the moulding recess, prior to thermoforming the finished texture modified food product;

FIG. 11D is a perspective view of a multi-pack of the texture modified starch product, illustrating perforation lines within the package;

FIG. 15C is a perspective view of an alternative mould for forming a texture modified product, illustrating a plurality of air vents through the mould to tailor the thermoforming process to more complicated mould forms;

FIG. 16 is a flow chart of a method for forming a texture modified food product from a starch source;

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION OF EMBODIMENTS

The texture modified food product described and illustrated herein is primarily in relation to starches and starch-based product. It is contemplated that the texture modified food product and method of preparation described herein is generally applicable to all manner of consumable starch sources, including breads, pastries, crackers, potatoes, muffins, bagels, cereals, pastas, noodles, rice and rice-based foods such as sushi. Some steps of the process are adjustable to cater for specific starch-based products which may require more or less rigorous processing due to the granular size and arrangement of the starch molecules therein.

The term "food" as used herein is understood to refer generally to edible products and all starches and starch-based products for human consumption.

The term "starch" as used herein is understood to refer to amylum, a polymeric carbohydrate comprising glucose units joined together by glycosidic bonds. Found in flour and grains and numerous other foods, starch makes up a large portion of the human diet and is converted by the body into valuable sugars.

Starch becomes soluble in water when heated such that the particles of starch swell-up and burst. As the particles burst the amylose leaches therefrom forming a matrix that holds water and thus increasing the viscosity of the liquid. This is referred to as starch gelatinization. As the liquid cools or stands, the starch particles recover their structure, further thickening the liquid and expelling water, which can form a thin layer on top of the liquid as it cools. These characteristics of starch-based foods require careful handling to achieve pleasant mouth feel, pleasant flavours and the required modified texture for safe consumption by dysphagic consumers.

Figure 1:
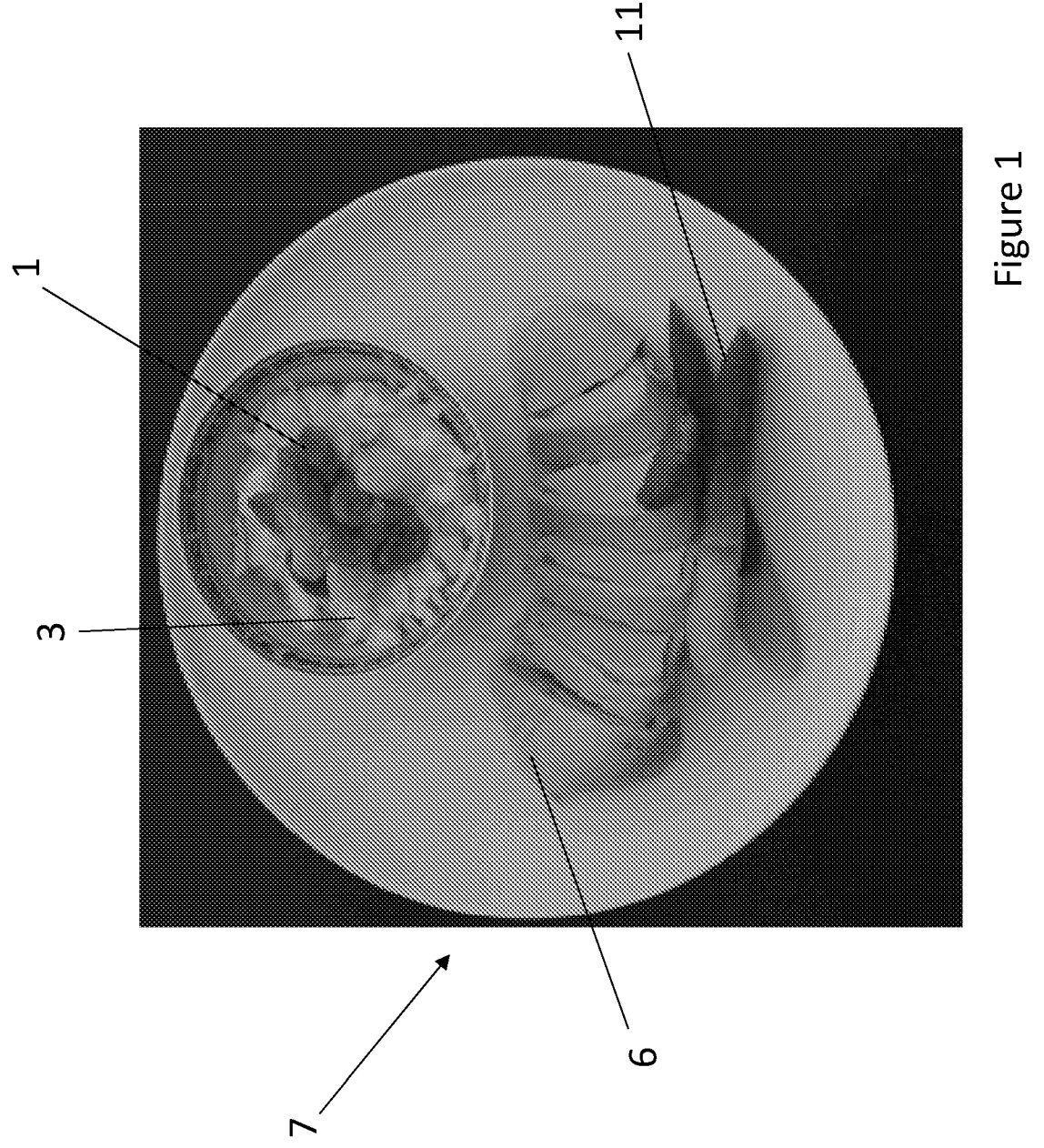
FIG. 1 is a representation of a texture modified meal, comprising a texture modified meat product a texture modified vegetable product and a texture modified rice product, together the elements of the meal are configured to look, taste and smell like a serving of "Hainanese chicken rice" according to an embodiment of the invention.

With reference to FIGS. 1-9, there is provided a plurality of modified food products 1, each product 1 comprising; a paste 32 formed from an edible starch-based product, the paste 32 retaining the flavour of the selected starch-based product; and an additive selected from a group comprising: Xanthan gum; Carrageenan; Agar-Agar; Guar Gum; Gum Arabic; Gelatine; salt; and pepper, wherein the modified food product 1 is shaped and textured to a generic serve of the starch-based product selected to form the paste 32. In FIG. 1 the modified food products illustrated are made from vegetables 11, proteins 6 and starch-based products like rice 3.

Further modified food products 1 can be formed as potato-based food products 10 (FIG. 9), pasta-based food products 14 (FIG. 6), noodle-based food products 18 (FIG. 7), bread-based food products 16 (FIG. 8), to name but a few.

Returning to FIG. 1 a side dish is shown, comprising the modified rice-based product 3, that provides good nutritional density; looks like rice; smells like rice; and tastes like rice. However, the texture and consistency of the rice-based product 3 is configured to be safely consumed by dysphagic consumers and not to stick to the palate.

Due to the food preparation techniques described herein, and the flavour retained in the finished texture modified food, salt and pepper and similar seasonings are not required. However, some starch-based products can be flavour enhanced with salt and pepper, soy, mirin or dashi, for example rice.

A starch-based paste 32 can be made from any one of the following: rice, wheat, bread, noodles, rice crackers, pastry, pasta and any other starch-based food consumed by people regardless of cultural preference.

The internal texture of the texture modified food product 1 is akin to a puree, in that a consumer will not need to chew the food product to break it down for swallowing. Conversely, the food product 1 has a consistency that can hold the shape and texture of the desired food product 1 during and after being heated whether in a conventional oven, microwave, steamer or water bath.

The external texture of the food product 1 is formed from a moulding recess 22 of a die 20 in which the product 1 is moulded. An internal surface 28 of the mould can be stippled or textured 4 to resemble rice grains (see FIG. 2), or to resemble striations 17 on pasta shells (see FIG. 5), or breadcrumbs on top of a bread roll of the texture modified food product 1.

Figure 2:
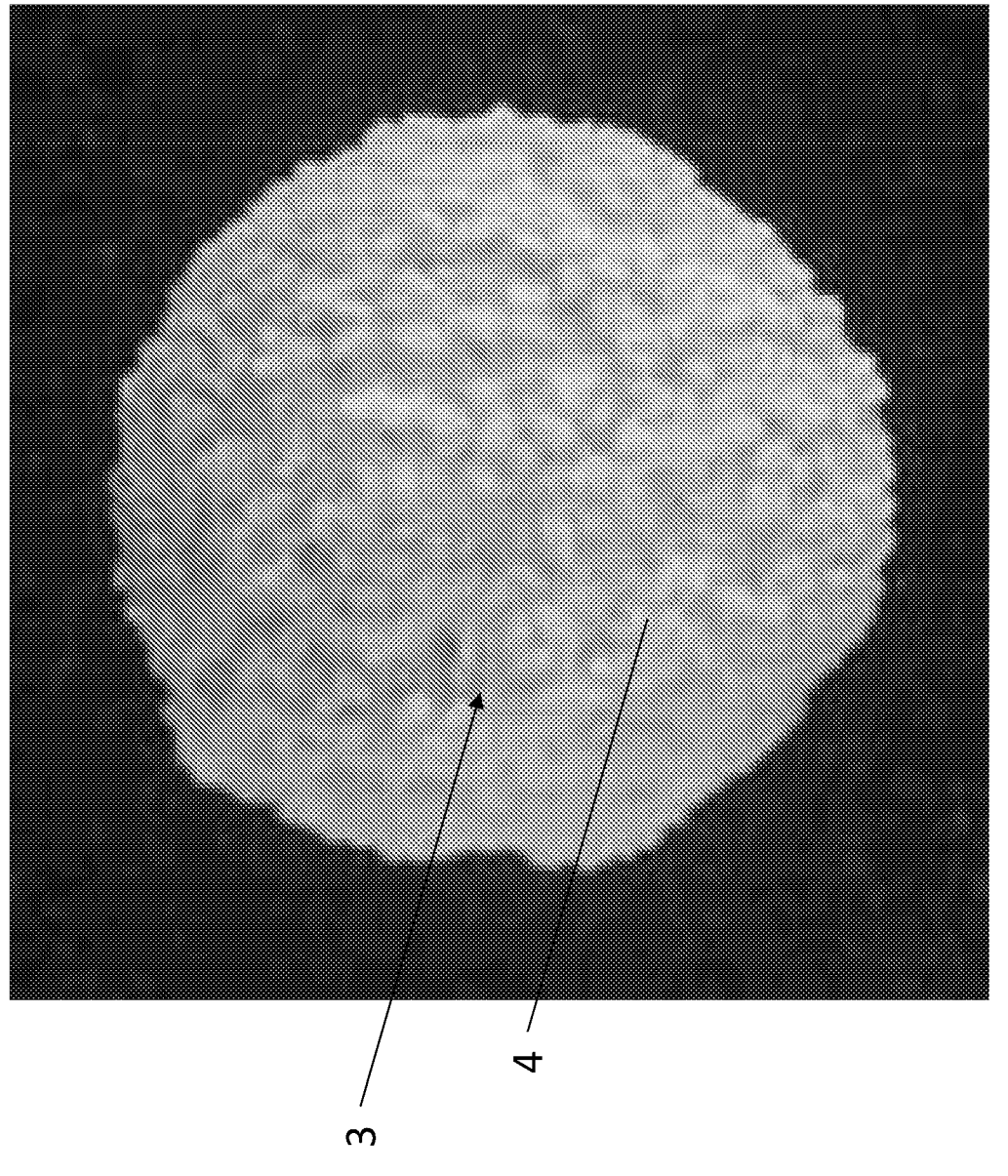
FIG. 2 is a perspective view of a texture modified food product in the form of a serving of rice.

Additionally, a second internal surface 31 of the mould can be textured with a secondary texture to provide striations or a threaded formation to resemble the selected food from which the texture modified food product 1 has been formed illustrated in FIG. 2, in the individual grains of rice in a serving of the texture modified rice-based product 3.

A single moulding recess 22 can be used to form the texture food product 1, which gives the food product 1 a flat-bottom. This can assist in keeping the food product 1 on a plate and prevents the product 1 from rolling around. For some consumers, this can be advantageous. As the product 1 can be formed with a flat-bottom, an alternative presentation of the product 1 involves joining the flat-bottoms of two products to form a single rounded, 3D food product, as illustrated by the bread roll 16 of FIG. 8, which illustrates a feint seam 5 showing where the two, flat-bottomed bread-based products 16 have been joined together. In a still further embodiment, 3-dimensional dies/moulds can be manufactured to allow 3D, non-symmetrical food products to be formed.

Figure 5:
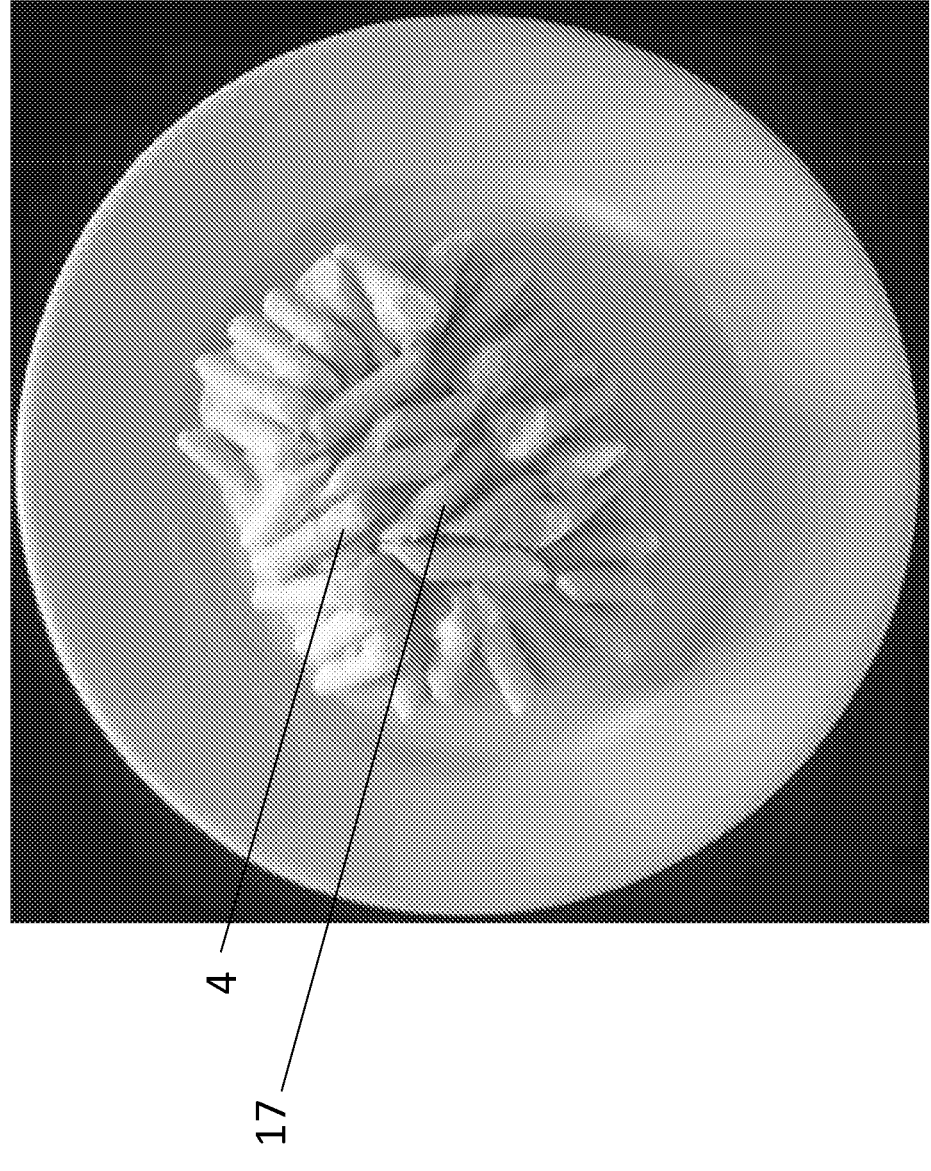
FIG. 5 is a perspective view of a texture modified food product with the texture and configuration of a serving of pasta.
Figure 6:
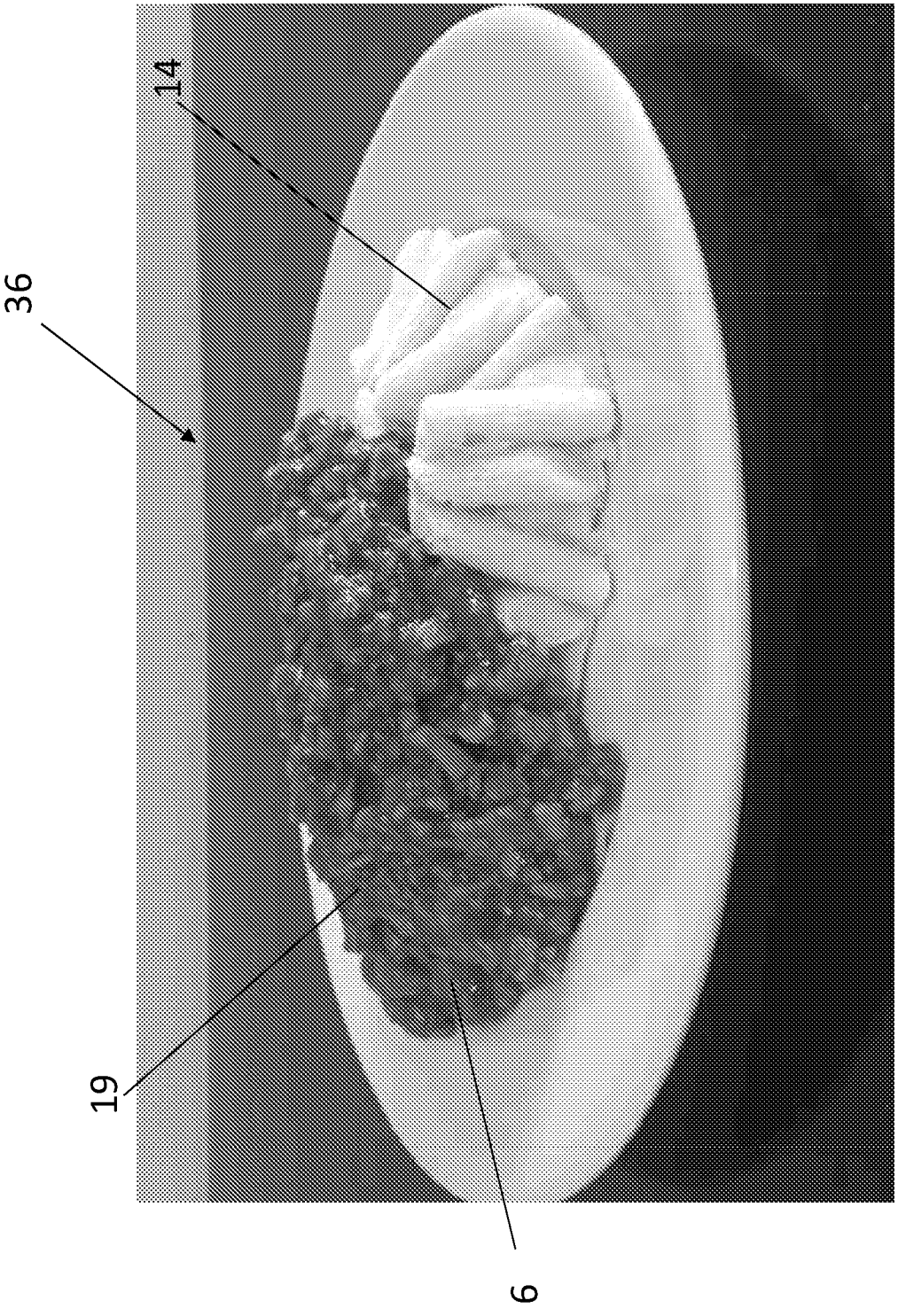
FIG. 6 is a perspective view of the serving of texture modified pasta, in combination with a texture modified meat product in a gravy suspension, configured to resemble a pasta Bolognese meal.

The texture modified food product 1 in some embodiments, is configured to resemble a whole product, for example a bread roll 16, or chicken breast 6. In some embodiments, the food product 1 is configured to resemble a portion of the starch-based product 1, for example a serve of pasta 14, as illustrated in FIGS. 5 and 6.

Figure 3:
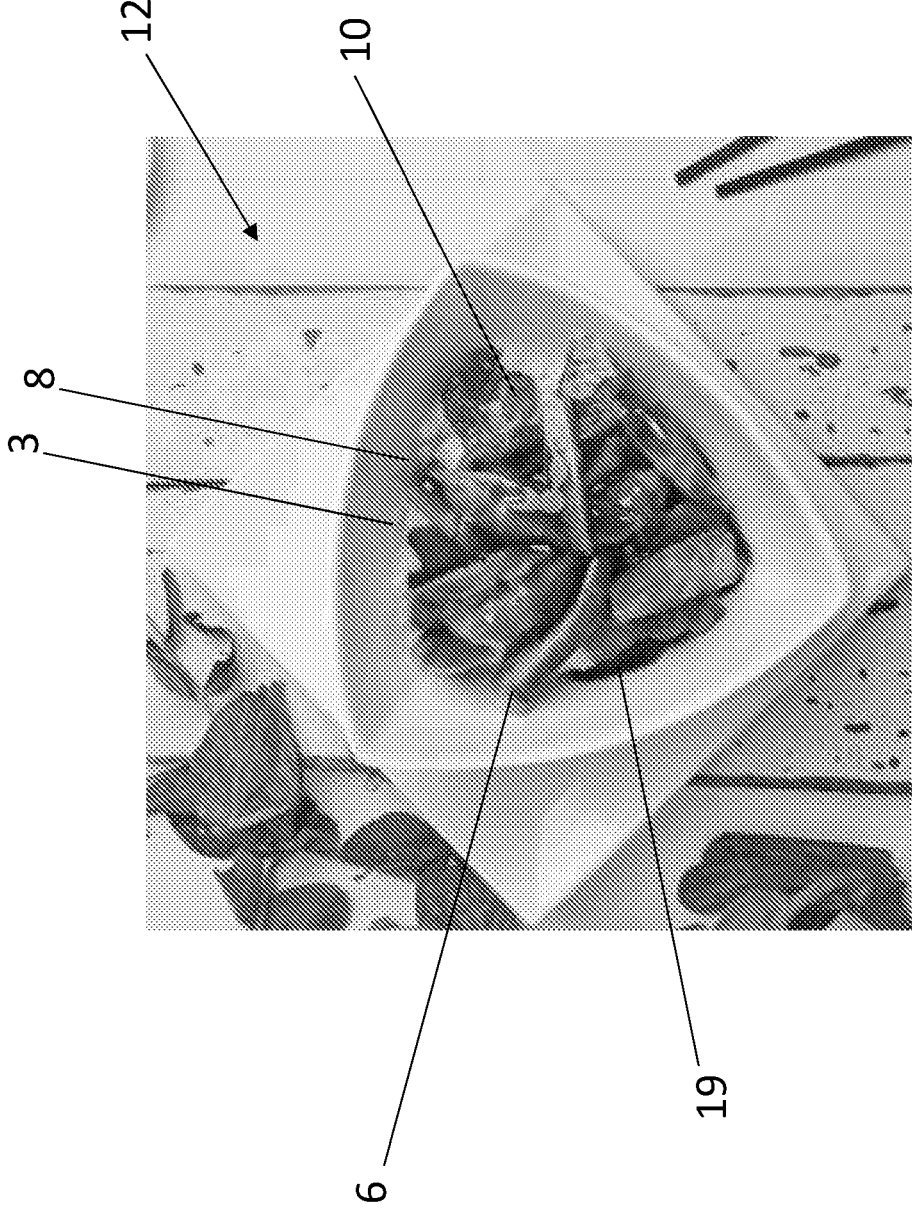
FIG. 3 is a perspective view of a meal combining a plurality of texture modified food products where texture modified protein product is combined with a plurality of texture modified vegetable products which have been cut and sliced to form a stir-fry meal served on a bed of texture modified rice.

In other embodiments, the texture modified rice-based product 3 can be plated with a serving of texture modified vegetable products 10, and protein-based products 6, to resemble a stir fry meal 12, as illustrated in FIG. 3. The meat product 6 can configured to resemble a cooked or diced form of the selected meat as illustrated in FIGS. 1 and 6. The texture modified vegetable products 11, can also be configured to resemble whole vegetables, for example a floret of broccoli 13 or a sliced carrot 8.

Figure 4:
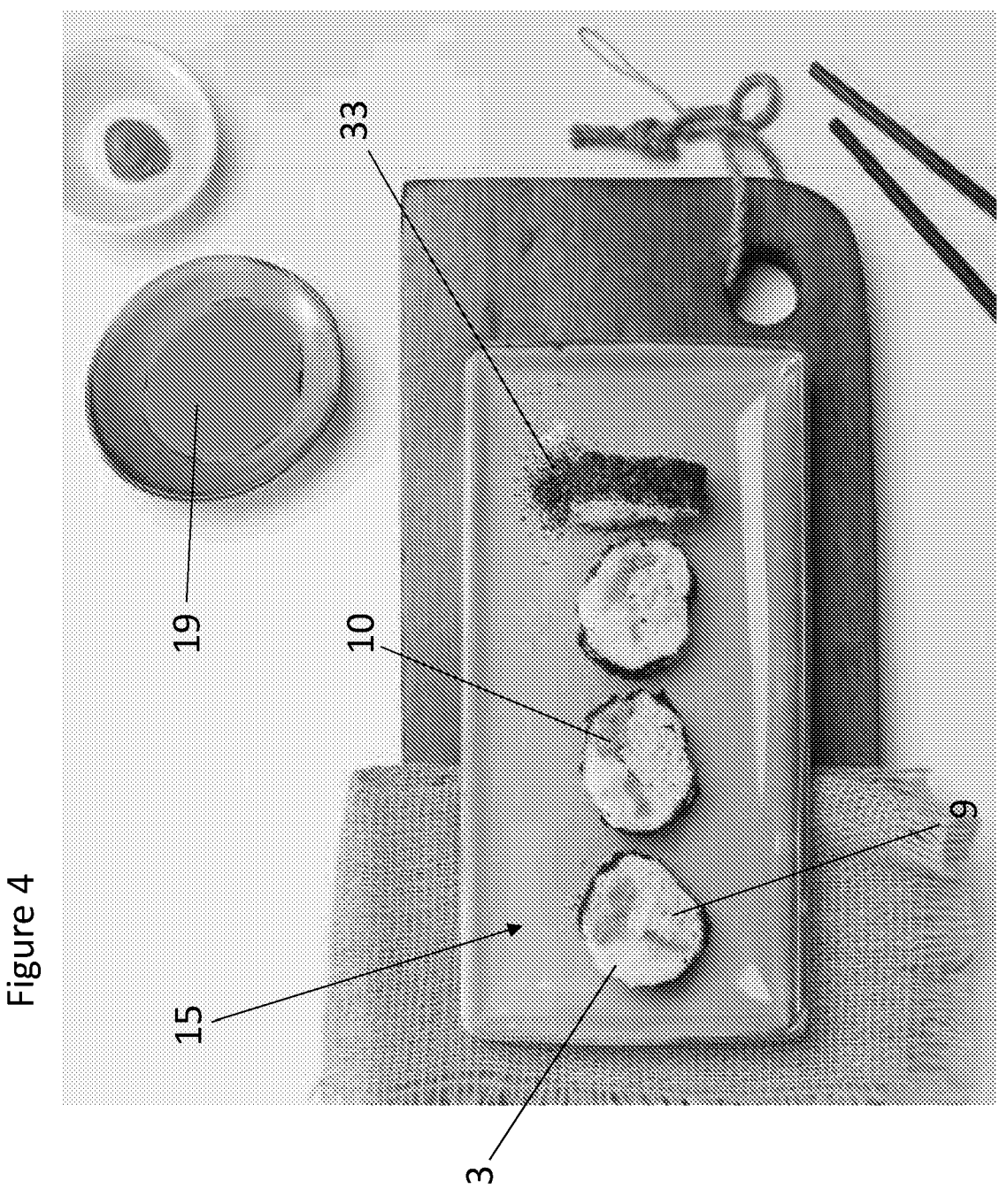
FIG. 4 is a perspective view of a sushi platter and accoutrements combining a texture modified rice with a plurality of texture modified vegetable products with a texture modified fish product, each of which has been layered and rolled in a seaweed dust to visually resemble a typical hand-roll sushi meal.

In another embodiment, illustrated in FIG. 4 a Japanese-style sushi meal 15 is formed to resemble sliced hand rolls. The hand rolls are formed from texture modified fish product 9, combined with texture modified vegetable product 11 and texture modified rice-based product 3. The components to form the handroll are formed in a cylindrical mould which can be coated with a seaweed powder 33, and then sliced into deep discs, to form a meal 15 that looks, smells and tastes like a Japanese hand roll. The mixture of vegetable products 11, meat products 6 and fish products 9 can be varied to create myriad flavour profiles closely resembling those available from a sushi bar. Additional accoutrements can be served with the meal 15, such as soy sauce or a form of soy gravy 19 to allow the consumer to modify the viscosity of each mouthful of food. Additionally, when preparing the rice-based product 3, mirin, dashi or other Japanese flavours can be added into the rice paste 32 as would be done in making typical rice for sushi hand rolls.

The mould can be designed such that, the finished food product 1 can embody subtle deformities or surface flaws and defects, that give the appearance of a cooked portion of rice or noodles or pasta, and not an overly idealised, "too perfect to be real" finish. In other embodiments, the texture modified food product 1 can be further divided or cut to give the appearance of a stir-fry dish 12, as illustrated in FIG. 3 or a Bolognese (see FIG. 6).

In each of the meals 12, 15, 36 and 37 of FIGS. 3, 4, 6 and 7, a gravy 19 or sauce or broth has been added to the meal. The consistency of the gravy 19 is also required to conform to predetermined standards, as a runny gravy (low viscosity) will pose the same danger of entering the lungs as the texture modified food products that it is applied to for a dysphagic consumer.

The gravy 19 is not as viscous as the texture modified food product 1 and can be used to adjust the consistency of the texture modified food product 1, by the consumer, at the time of eating as it is not required by this invention to achieve the predetermined texture consistency standards. The gravy 19 can also compensate for any dehydration to the starch-based product 1 where it has lost moisture during heating process. The addition of gravy 19 onto the texture modified product 1 also gives the visual effect of cooked pasta or rice, distinguishing from typical puree meals.

An alternative sauce or sweet syrup can be used on some starch-based food products to provide the benefits outlined above from a gravy 19, for example a maple glaze on a bread roll product or a soup/broth to accompany the noodle products or a pasta sauce.

In one embodiment, illustrated in the flow process of FIG. 16, there is provided a method of preparing a texture modified starch-based food product 1, comprising the steps of:

(a) cooking a starch-based product, where required;
(b) dehydrating the starch-based food to remove water;
(c) grinding the dehydrated starch-based food to form a fine powder;
(d) adding a carrier to the fine powder to coat the powder;
(e) rehydrating the coated powder to form a paste 32; and
(f) forming the paste 32 into the texture modified starch-based food product 1 shaped and textured to a generic serve of the starch-based food selected to form the paste.

Rice

In one embodiment, the method is directed to a rice-based food product, which is best cooked first. Once the rice is cooked and subsequently cooled, the above method is applied. The cooking process is selected from any one or more of the following cooking processes: boiling, steaming, microwaving, grilling and roasting.

The rice is cooked until fluffy, to break-down (denature) the starch. The amount of cooking is the same as would be required if cooking the rice for immediate consumption.

For starch-based food products there is less risk of bacteria than when preparing meat or fish products. Cooking the rice or pasta before drying provides a sufficient kill step in the process to remove/kill unwanted bacteria ibn the starch-based product.

For many people, their appetite is not merely stimulated by taste but by the visual appearance and smell of food. As such, for people with anorexia (or loss of appetite) the appearance and smell of a food is increasingly important to stimulate their appetite.

Cooking the starch-based food product in boiling water or any other cooking method provides for the removal of most aerobic microbial surface contaminants and bacteria from the surface of the product. This is of great importance in view of the health and wellbeing of the intended consumer. This stage of the processing is sometimes referred to as a "kill step" as it is an important food hygiene step in the process.

The cooked, starch-based food product is then dehydrated to remove as much moisture as possible. One example would be to bake the cooked product to dehydrate the product until it is bone dry. Alternately, the cooked rice could be dried in a drying tunnel or other commercial cooking apparatus, until the rice becomes a moisture less grain. As there are bacterial risks with warm rice, steaming is an ideal cooking process that provides a sufficient kill step, typically up to temperatures of 110° C.

Once dehydrated, the product is ground or milled to a fine powder that retains the colour, smell and flavour of the originally selected starch-based product. The fine rice powder is about 40 microns of less (a flour-like consistency). This fine powder can be safely stored in this manner, if required.

A carrier, such as oil, or vegetable oil is then introduced to the fine powder. The particles of the fine powder are well coated in the oil at a ratio of about 10:3. For example, 100 g of fine powder is combined with about 30 g of oil. The oil and the fine powder form a roux that will evenly disperse in water.

Once the oil (carrier) is added, the next method step is to add any required flavouring. For some starch-based food products flavouring are not required, as the starch-based food products will take flavour from the sauce/gravy/soup with which it is served. In other starch-based food products flavourings can assist in helping the tmf resemble the non-tmf product, for example mirin or dashi or other oriental sauces and spices.

Once the roux is flavoured, if required, cold water is added to the roux to form a paste 32, about 350 g to each 100 g of powder. The water should be lower and certainly no more that 10° C., otherwise the paste will become lumpy. Adding cold water allows the cold water to be absorbed into the starch granules, s the paste 32 warms to room temperature, the fine particles continue to reabsorb water and swell-up.

The paste 32 is them formed to resemble a serve of the starch-based food product selected to form the paste. The resulting paste 32 retains a greater nutrient density than a typical boiled/blended puree.

In working out the amount of water to add to the roux, there comes a point when the paste can be seen to take on a silky texture. Similar to whipping egg-whites, the paste 32 takes on a sheen and begins to form soft peaks. This an excellent indication that the desired consistency has been achieved and that the resulting paste 32 will not have a rough or grainy mouthfeel when consumed. Adding chilled water, whilst the paste 32 stands, will allow the paste 32 to thicken.

Once the paste 32 has thickened it is time to add Xanthan gum to the paste 32. Xanthan gum gives the finished paste 32 a snotty texture which aids in removing the stickiness of the finished texture modified rice product. The Xanthan gum also stabilises the texture modified food product during heat prior to consumption. This stickiness is dangerous for people with dysphagia as food can stick to the palate and present a choking hazard. Contrary to expectations, the Xanthan gum does not make the rice stickier but provides a snotty texture, that is smooth and slippy but not sticky and thus does not stick to the palate making it is easier to swallow. The snotty texture is best likened to an almost pre-chewed texture, more natural to how person would typically chew food; and introduce saliva in the mouth to start breaking-down food prior to swallowing.

It is preferable that Xanthan gum is not added to the roux prior to the cold water, as this can inhibit the starch molecules ability to reabsorb water.

It is preferable that the texture modified food product is not dispersed around the mouth as this can increase the opportunity for the food to be inhaled. The snotty texture achieved with the addition of Xanthan gum 0.3%-0.6% reduces the dispersion risk to the consumer.

The following is a list of gums and gels that have similar properties which can be used along with, or as an alternative to, Xanthan gum in the texture modified starch-based products of embodiments of the invention: Carrageenan; Agar-Agar; Guar Gum; Gum Arabic; and Gelatine, to name a few. It is not ideal to add extra starch to the already starch filled paste 32, however, some starch-based products, like pasta, will benefit from the introduction of AMPS.

The next stage of the process is to assess the consistency of the starch-based paste 32 and for some, an additional step may be required to adjust the mixture to increase its flow characteristics to comply with a predetermined standard. To adjust the flow characteristic fibre is added and then the paste consistency is re-assessed. This can be conducted by testing whether the paste 32 can hold soft peaks. If required, more fibre is added until the desired consistency of the paste 32 is achieved.

The finished paste 32 is then put into a mould 22 to shape the paste 32 into the appropriate serving form. Both mirin and other flavourings can be added at this stage to achieve the desired flavour profile.

An alternative method of forming the paste 32 can be used that by-passes the earlier steps of this method by using rice crackers, which are already cooked and dehydrated. If using rice crackers, the cooking and dehydrating of the rice is not required.

The rice crackers are ground down to form a fine powder in a bowl cutter mill of a stone mill, for example about 100 g. Oil is then added, and the fine powder is whisked in to the oil, for example about 60 g of vegetable oil to form a roux. Agglomerated Modified Potato Starch (AMPS) (about 6-7 g) and fibre can be added to the mixture until the roux looks like a wet breadcrumb mix or a wet sand, for example about 12 g of bamboo fibre. Further oil (10 g of vegetable oil) can be added with Xanthan gum (about 4-5 g) to form the paste 32 in preparation for moulding. Chilled water (below 10° C.) is then added and the paste 32 is whisked until the roux dissolved into the mixture. The paste 32 is then allowed to stand for 10-20 minutes and can later be moulded and frozen.

Figure 17:
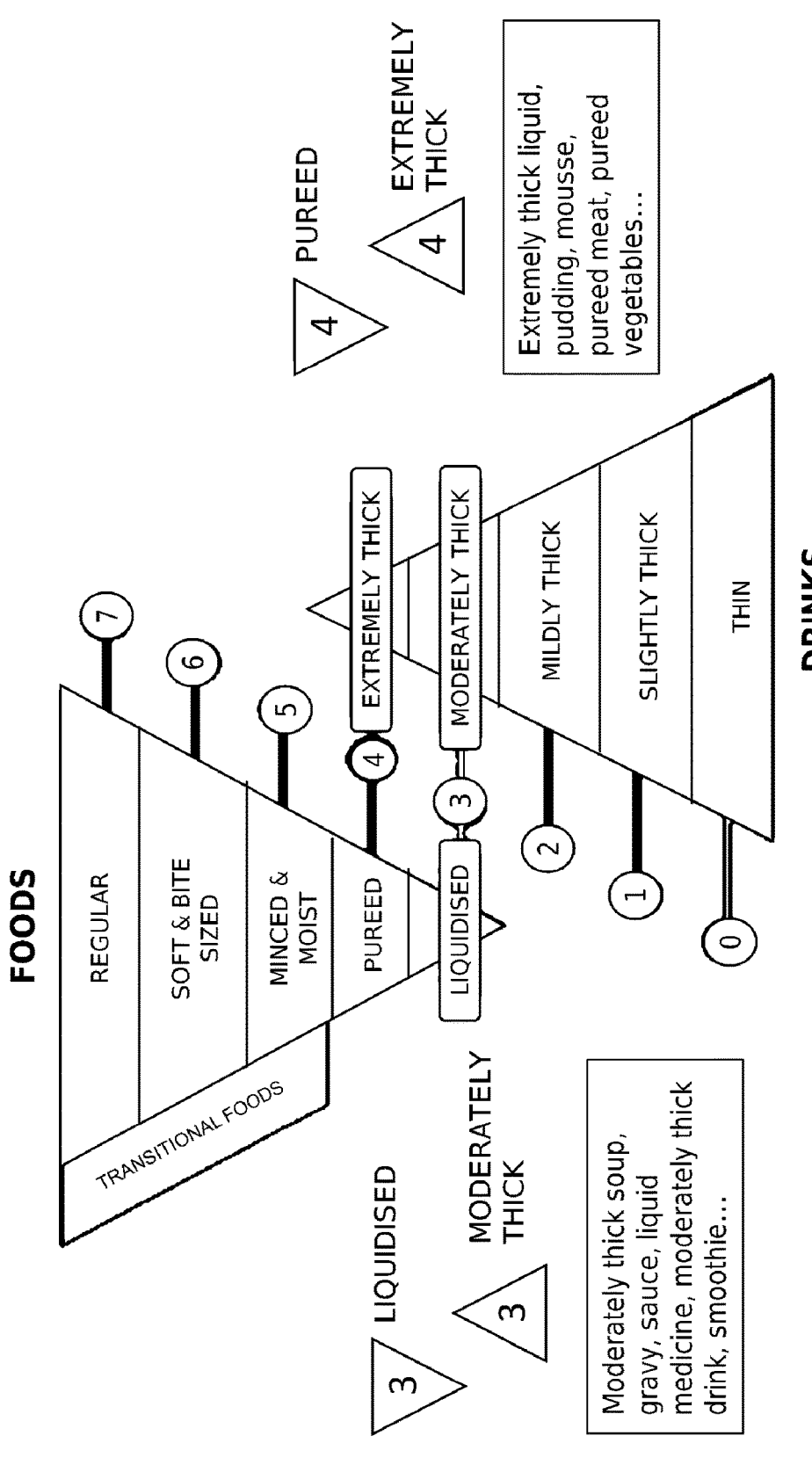
FIG. 17 is a chart formulated by IDDSI on the properties of texture modified foods.
Figure 18:
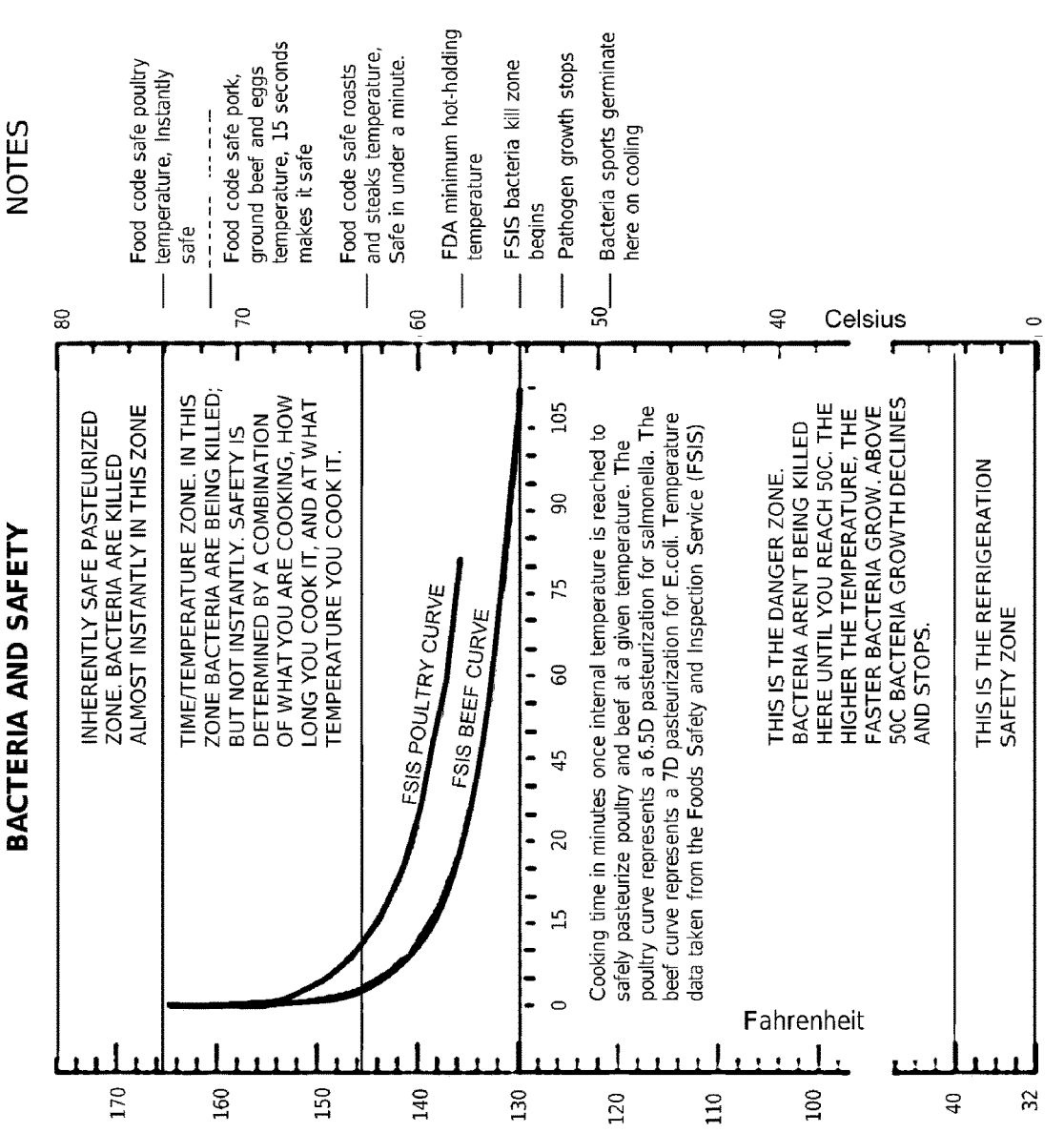
FIG. 18 is a bacterial safety chart on the temperature and duration of required kill steps for safely handling certain foods.

The desired consistency of the texture modified food product is defined by the IDDSI (International Dysphagia Diet Standardisation Initiative) fork drip and spoon tilt tests (see FIG. 17). This standard is planned to be rolled out 1 May 2019.

The fork drip tests (or flow tests) are directed more to the viscosity of the prepared food. While the spoon tilt test is more directed to the cohesion and stickiness (adhesion) of the food. For example:

The fork drip tests for level 3—state that the liquid should drip slowly through the tine of the fork in dollops or strands.

The fork drip tests for level 4—state that the liquid should be extremely thick and sit in a pile or a mound above the fork. A small amount may flow through the fork forming a small tail below the tines of the fork. The liquid must no dollop, flow or drip continuously though the fork prongs. All of these requirements are in combination with the requirement for no lumps, not sticky, require no chewing, hold shape on the spoon, and hold shape on a plate with only slight slumping.

The spoon tilt test, states that the product should slide from the spoon leaving a film on the spoon but not be too stick or be too heavy. For example, both Greek yogurt and peanut butter would be sufficiently viscous to hold their form, but peanut butter would be too sticky to fall from the tilted spoon, and thus too sticky for someone at level 4 to safely consume.

Pasta and Noodles

The starch-based food product can be formed to resemble, in flavour and aesthetics, a pasta or noodle. The paste 32 can be formed using wheat-based starch products or rice, for rice noodles and the like.

Figure 7:
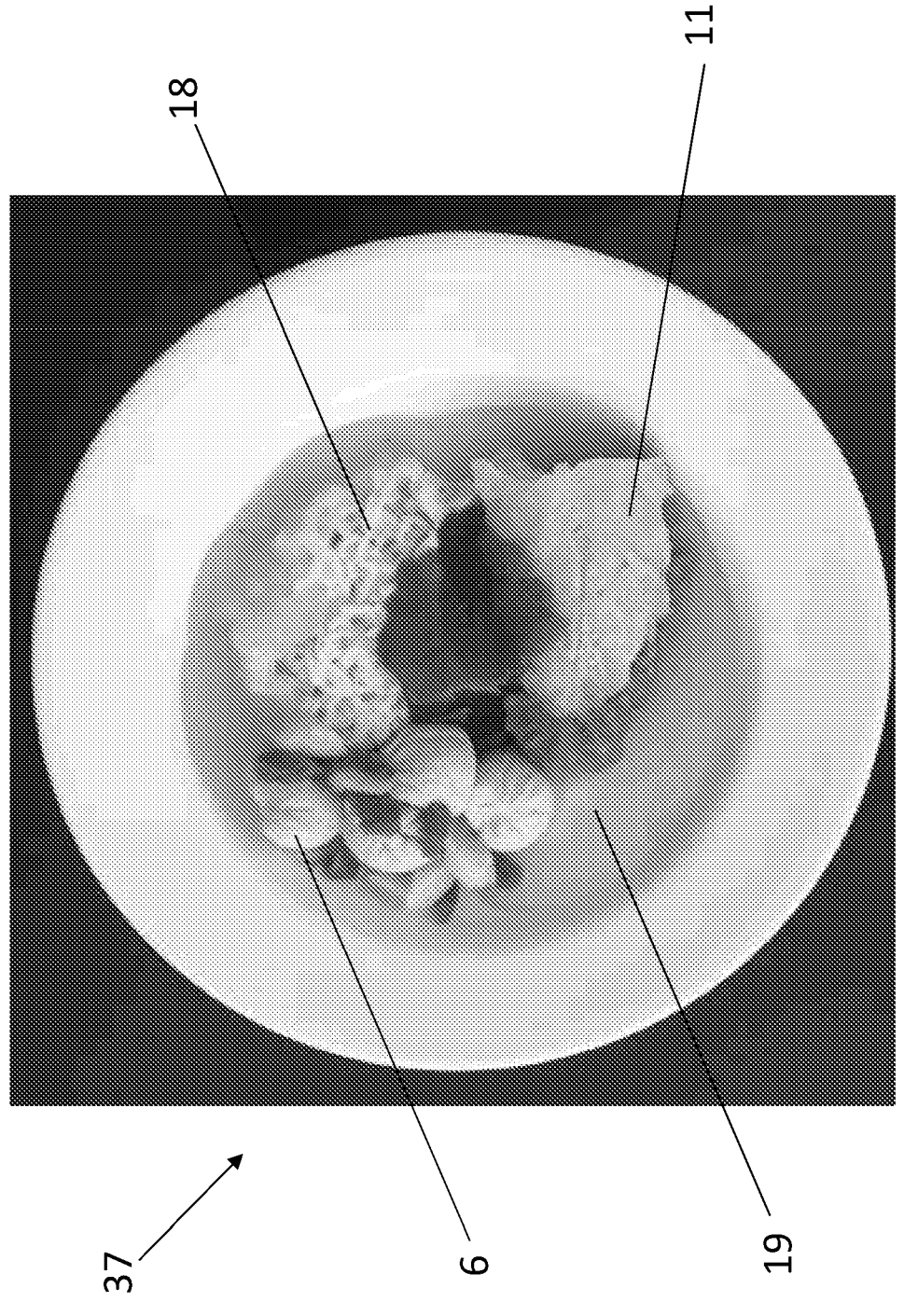
FIG. 7 is a representation of a meat, a vegetable and a noodle texture modified product configured to taste and visually resemble bao buns and green leaf vegetable with noodles.

Similar to the above method described for making a texture modified rice product, the method begins with the cooking of noodles that are then dehydrated, oiled and seasoned, before being rehydrated and whisked to form a paste 32. FIG. 7 illustrates a noodle-based dish 37 of texture modified egg noodles 18, texture modified pork buns 6 and texture modified vegetable product 11. Wheat noodles can be used to form a wheat-based noodle product as shown in FIG. 7, and rice can be used to form a rice-based noodle product.

The pasta should be cooked al dente, to obtain a similar flavour profile as you would want from the pasta if you were to eat it.

The pasta can be dehydrated in an oven at about 60-80° C. to get all of the moisture out of the cooked pasta. As with the rice method described herein, about 30 g of oil is added to about 100 g of dry powder, to form the roux.

Cold water is added to the roux to form the paste, this rehydrates the starch in the paste, to allow the starch to disperse evenly though the paste. Once the desired consistency is achieved, Xanthan gum (about 0.6%) is added to the paste.

The method can be shortened by using rice crackers, as described herein to form the rice-based paste 32 or using instant dried noodles to form a noodle-based paste 32.

Bread

The method for making bread-based texture modified food products 1 is different to that described above in relation to rice and pasta style foods.

The method starts with a bread roll or loaf, or other bread product, where the crust of the bread is removed to leave only the soft central body of the bread. The soft bread body is the dehydrated to allow the bread body to be blitzed or ground to a very fine powder.

Meanwhile, the striped crust of the bread is also dehydrated and blitzed into a fine powder, having a darker colour and deeper bread-like aroma.

A small amount of oil is added to the very fine powder to make a gummy roux. At this time other additives may be introduced to the roux, for example salt, pepper, or any desired herbs or spices.

Chilled water is then added to the roux to rehydrate the roux and disperse the starch therein, before Xanthan gum is added to stabilize the roux.

A soufflé style mixture is also created using whipped egg whites, sugar, sat, vinegar and crème of tartar. The acid and salt cure the eggs. And the mixture is whipped until aerated and soft peaks can be held by the mixture. This mixture is then folded into the roux to form the bread-based paste 32. Folding is done gently, so as to keep the air in the paste 32 giving it a light mousse-like consistency.

The paste 32 can be added directly into a mould, although in some cases the mould can be dusted with more of the fine bread powder (or the bread powder with seasonings) to enhance the appearance and the flavour profile of the exterior surfaces of the bread-based texture modified food product 1.

The moulded (possible coated) bread product is then cooked like a pavlova, at a low temperature e.g. 120° C.-140° C. for about 35-40 minutes. The internal core of the bread-based modified food product 1 need to have the internal core raised to over 65 degrees Celsius of at least 8 minutes to provide the necessary kill step for the eggs.

Figure 8:
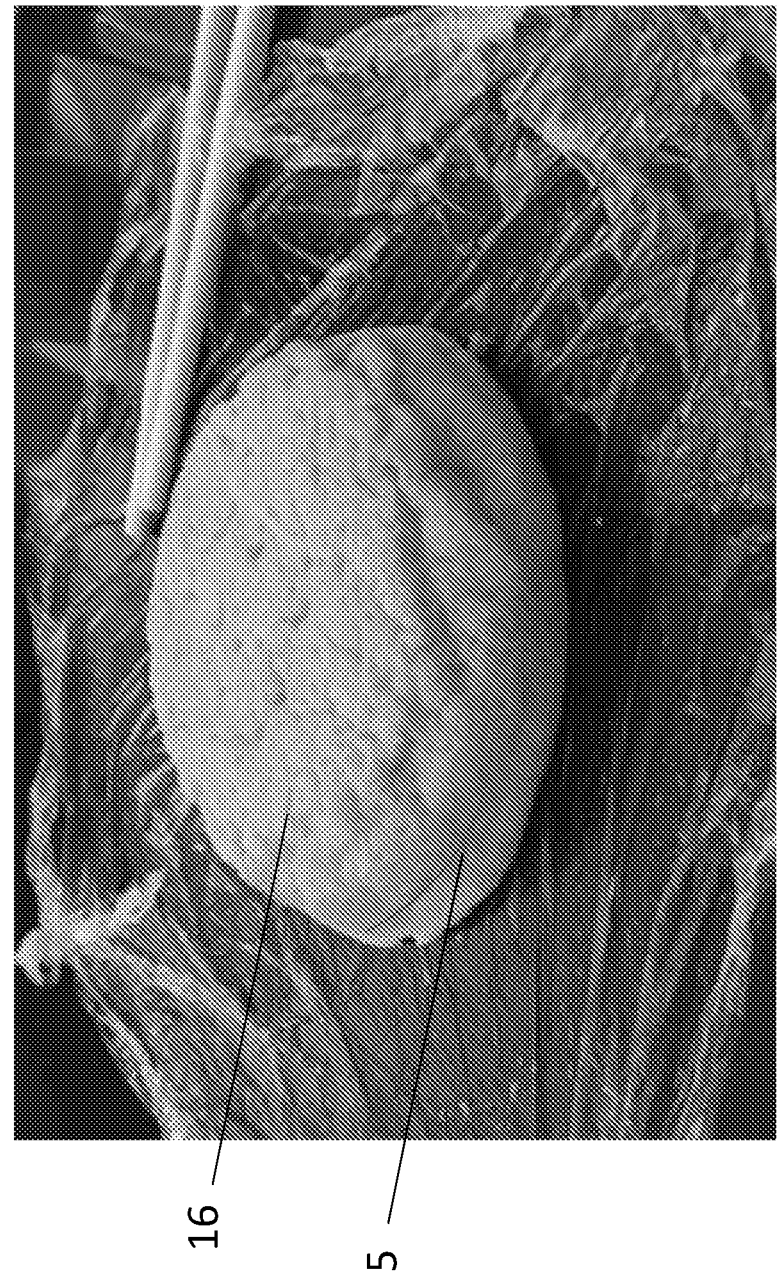
FIG. 8 is a representation of a texture modified starch-based product, that has been processed and formed to taste, smell and look like a bread roll.
Figure 9:
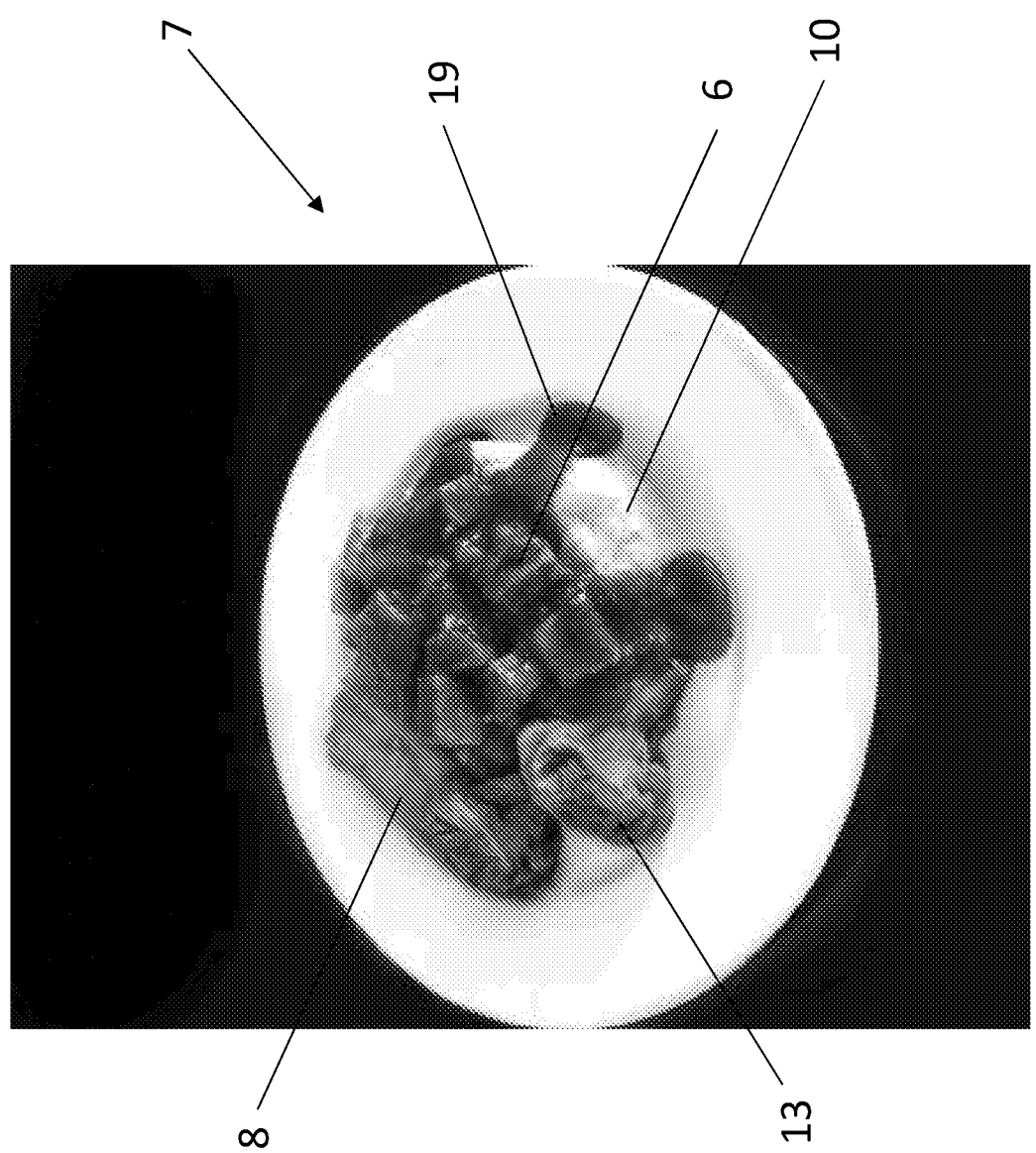
FIG. 9 is a representation of a texture modified meal comprising texture modified carrot and broccoli products, texture modified beef in a gravy, served on a bed of texture modified rice product.

The finished bread-based food product takes on the flavours, the aroma and the appearance of a bread roll, as illustrated in FIG. 8, as a texture modified food product 1. The International Dysphagia Diet Standardisation Initiative (IDDSI) Framework While an international standardised system has not yet been established, a framework has been put in place to assess the consistency of both food and drink for those affected by dysphagia. The IDDSI uses specific terminology and definitions to describe texture modified foods and thickened liquids comprising 8 defined and colour coded levels (0-7). The studies conducted in putting together this framework found many factors that influence the flow behaviour and thus the rating of a food or a drink. These factors include: viscosity, density, yield stress, temperature, propulsion pressure, fat content and shear rate. In taking each of the above factors into consideration, the food and drink rating of 0-7 is derived from a gravity flow test. The test measures a retained volume of food or drink from a 10 mL sample left in a syringe after 10 seconds of flow. The categories rated 0-7 are illustrated in FIG. 17.

The IDDSI framework equates pureed food with an "extremely thick" liquid, which is defined as a liquid that sits on a spoon and does not flow off it. This is contrasted to a "moderately thick" liquid which would drip in dollops off the end of the spoon. The difficulty with a product that is too solid must be carefully balanced against the product being too viscous and flowing into the airways of the consumer, leading to additional medical complications.

Once the starch-based paste 32 meets the required consistency, the paste 32 is introduced into the sterile lining material of the mould recess 22 of the die 20 to set the paste 32 into the finished serving shape of starch-based product. The introduction of the paste 32 into the recess 22 can be done when the paste is warm or cold, depending on the selected starch but is preferably done cold.

A starch-based food product serving shaped recess 22 having a complex texture and/or fine detail can benefit from the paste being introduced into the die 20 while still warm, as this fills the recess 22 more completely.

Figure 13:
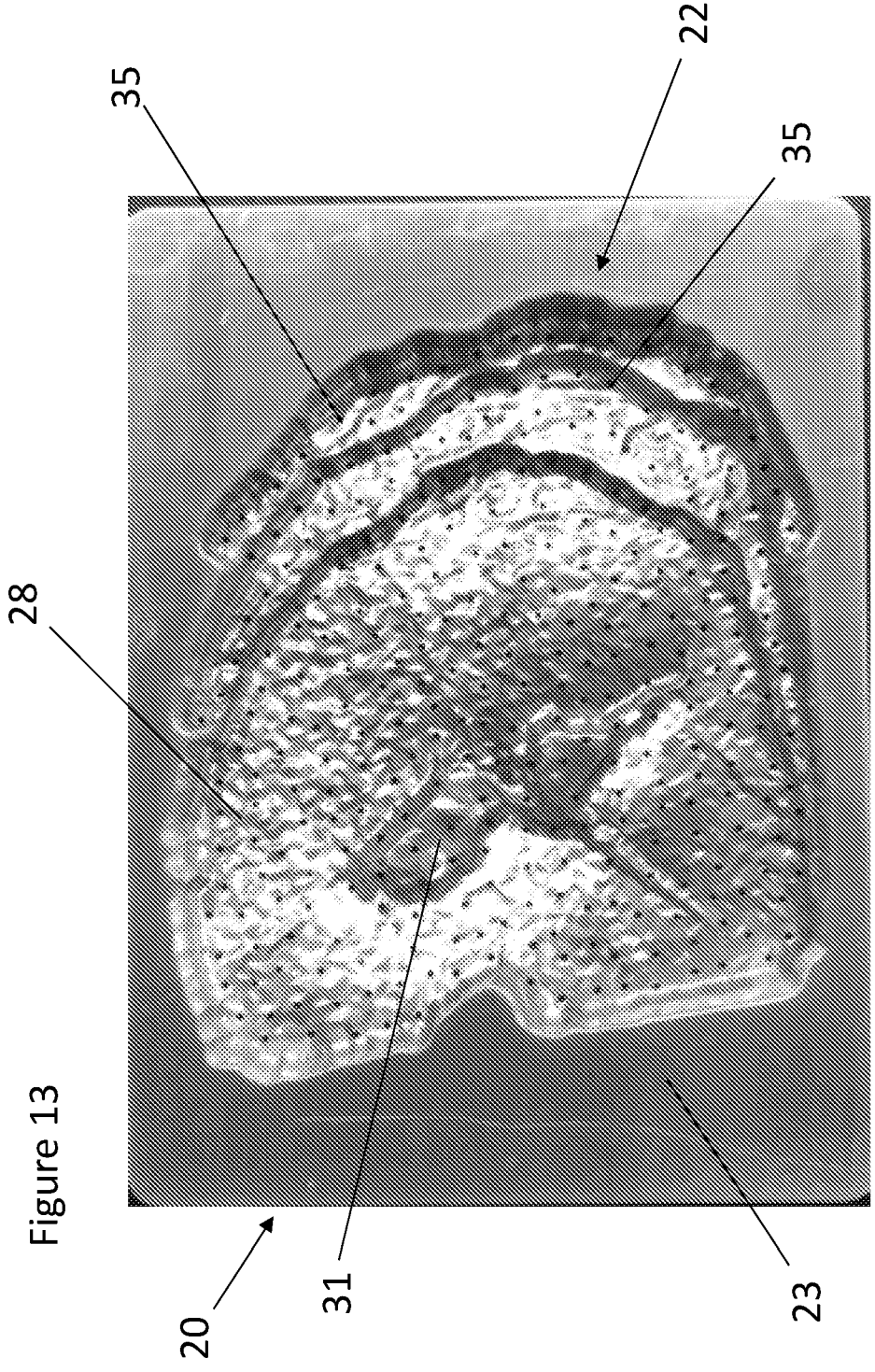
FIG. 13 is a top view of a die having a single moulding recess for forming a three-dimensional, flat bottomed texture modified starch product, illustrating a plurality of air passages extending from the moulding recess into the body of the die.

The die 20 is cut from an aluminium billet. The billet is machined to create a die base 21 and at least one moulding recess 22, illustrated in FIGS. 10A and 13. The moulding recess 22 can be CNC cut or laser cut and is shaped and textured to resemble a serving of the starch-based product.

Figure 14B:
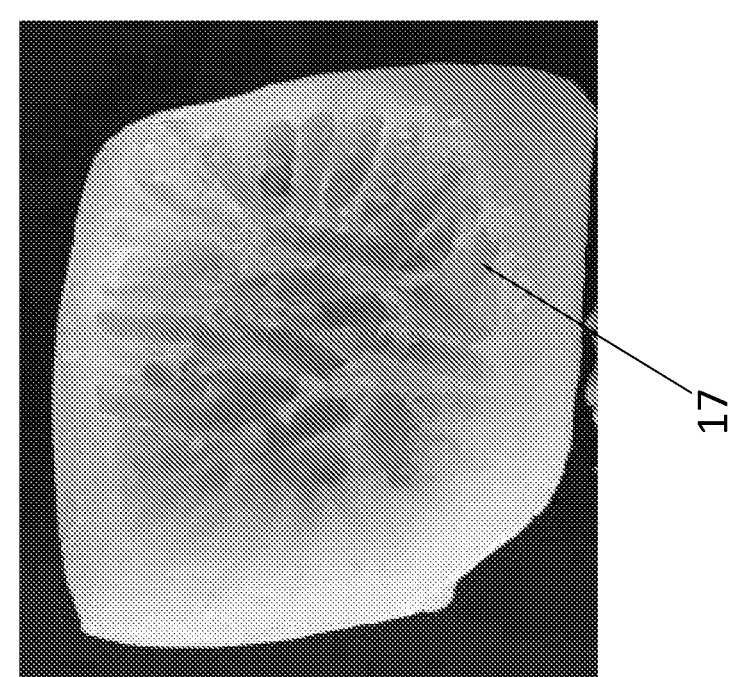
FIG. 14B is a top view of a mould from which a die is configured for a serving of pasta.
Figure 14A:
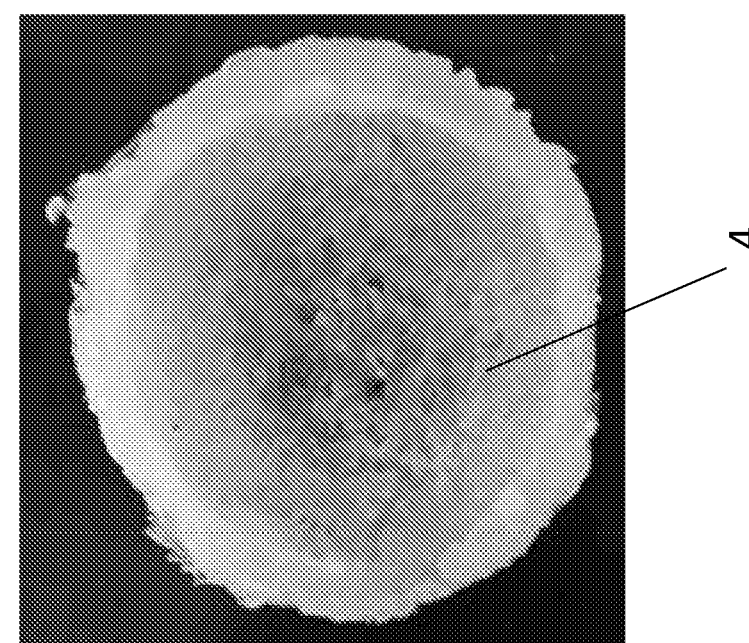
FIG. 14A is a top view of a mould from which a die is configured for a serving of rice.

Accordingly, the details and form of the recess 22 can be taken from a 3D scan of a heap of pasta or a portion of rice, as required (see moulded impressions in FIGS. 14A and 14B from which a master mould can be cast). Alternative forms of moulding can be used to replicate more simplistic shapes. However, the 3D scanning techniques enable very complex mould forms to be created, increasing the illusion that the finished texture modified starch-based product 1 is a non-texture modified starch-based product.

The recess 22 is formed into a top surface 23 of the die 20, and as such will produce a finished food product having a flat-base. Where a fully rounded food product 1 is desired, a pair of flat-based food products can be fused together, as illustrated with the texture modified bread roll of FIG. 8.

Figure 12:
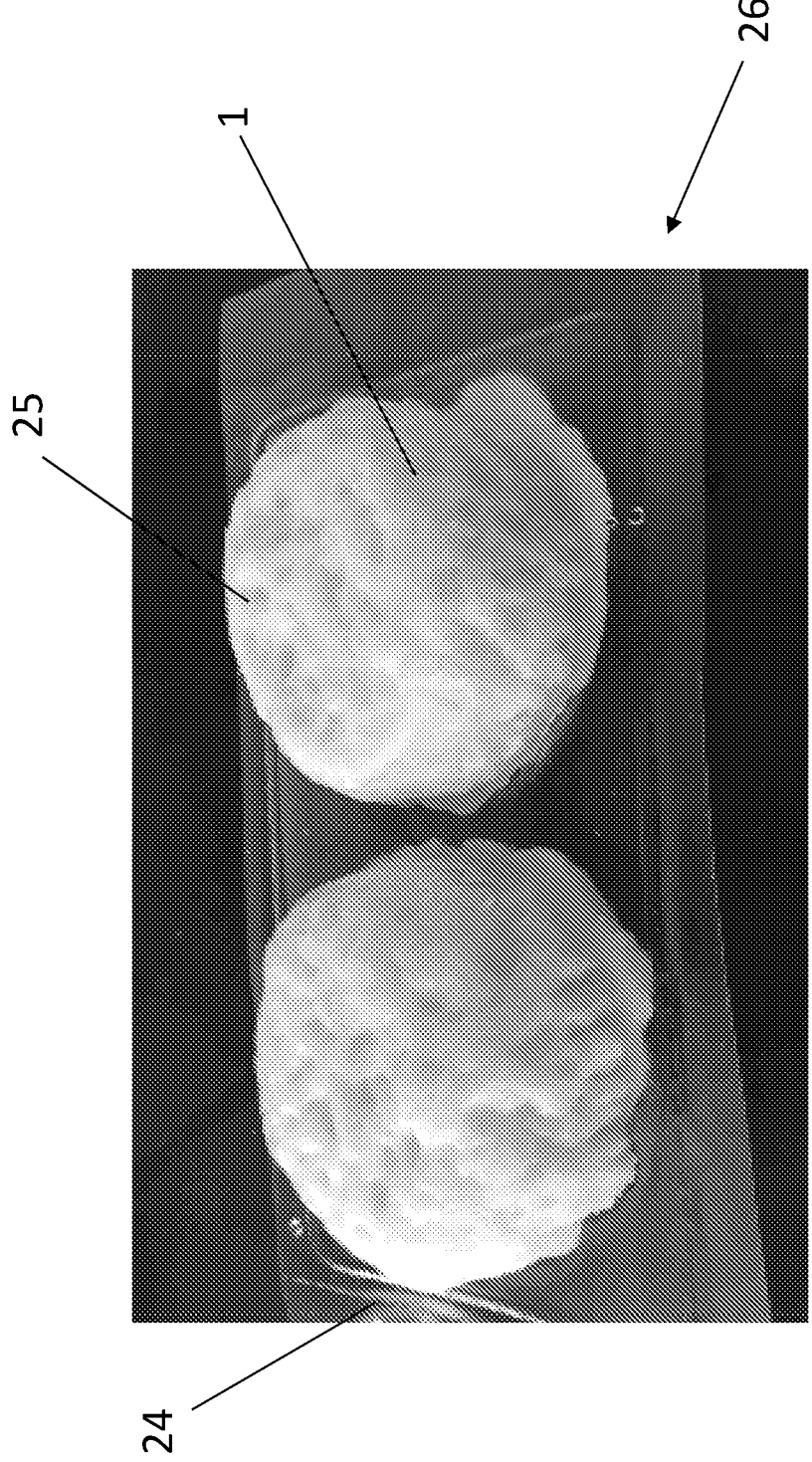
FIG. 12 is a perspective view of a packaged texture modified starch product in the form of a plurality of rice servings.

The top surface 23 of the die 20 can also provide tabs 2 or alternative cooperating protrusions and recesses to assist in the sealing and packaging of a finished food product 1, illustrated in FIG. 12 as a plurality of packaged single serves of modified starch-based product 1.

Effectively, the bread roll, in FIG. 8, constitutes a double portion of the finished texture modified food product 1. However, each individual starch-based food product constitutes a single-serve portion, typically between 100 g-120 g. When a consumer's needs have been assessed, a meal can be configured with the correct number of modified food products 1 to provide the required nutritional requirements.

Furthermore, the portion size in any given meal can be easily increased or decreased to account for fluctuations in the consumer's appetite. Traditional puree moulds do not provide this level of flexibility with no variation for small, medium and large portions. This can lead to waste of uneaten food and deterioration of the consumer's appetite, where the volume of food presented is off putting. Additionally, the texture modified food product can be off putting when an unrealistic or unnatural portion size is placed on a standard dinner plate.

Figures 15A, 15B:
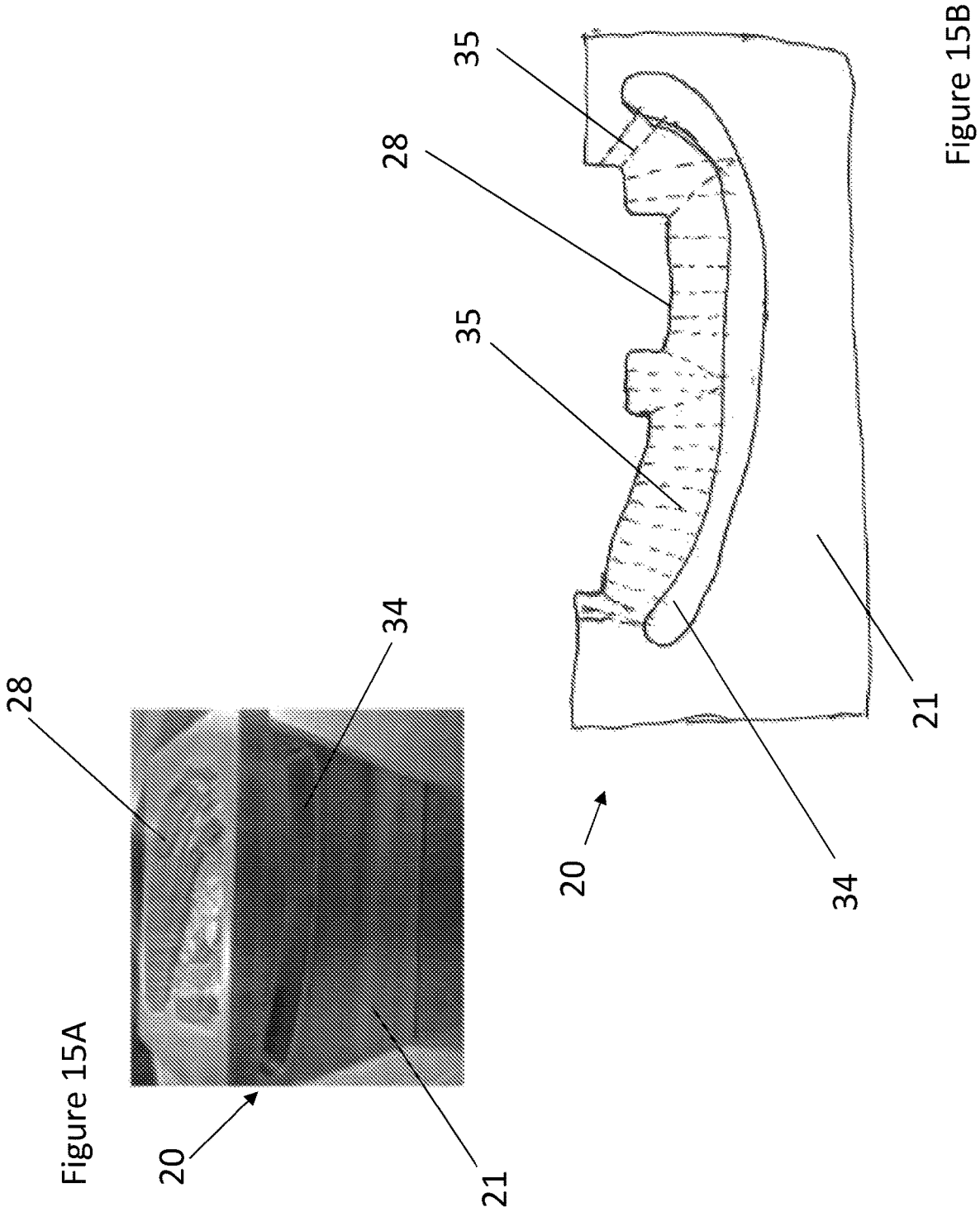
FIG. 15A is a perspective view of a die for forming a texture modified food product, illustrating an air vent extending through a base of the die into a moulding recess on a top surface of the die, to assist in the forming process.
FIG. 15B is a sectional view through the moulding recess of the die in FIG. 14A, illustrating a primary air passage in the base of the die and a plurality of supplementary air passages in fluid communication with the primary air passage and a surface of the moulding recess.
Figure 15C:
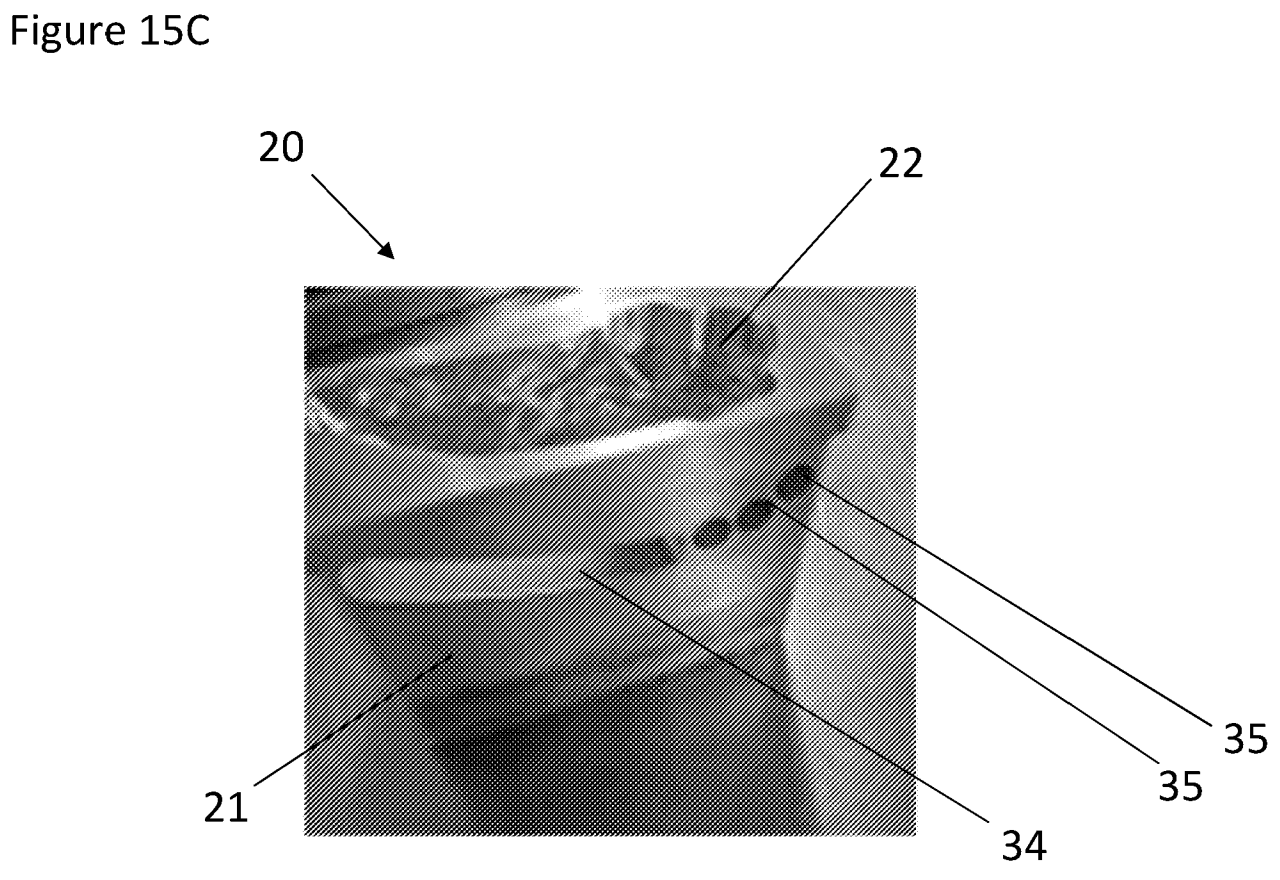

The base 21 of the die 20 comprises a primary air passage 34 to facilitate thermomoulding or thermo-forming of the food product 1 (see FIG. 15A). In some embodiments, at least one supplementary air passage 35 is provided to increase suction to targeted portions of the moulding recess 22 (see FIG. 15C). The or these supplementary air passages 35 facilitate use of more complex moulding recesses 22 to provide more detailed and thus more realistic looking starch-based food products. Some existing puree foods have been set into food moulds made from children's toys, such as those designed for plasticine or PlayDoh™; however, the end product is unrealistic and unappealing.

The die 20 is designed to be used with a lining material 24 laid out over the recess 22 of the die 20, illustrated in FIGS. 11B-11C. The lining material 24 is flexible and pliable enough to take on a complex form of the recess 22. When the die 20 is inserted into a thermo-moulding machine, a vacuum is created that sucks air out of the recess 22 via the passages 34, 35 to draw the lining material 24 tightly against a surface 28 of the moulding recess 22 in preparation for receiving the starch-based paste 32, illustrated in the cross-sectional view of FIG. 11A.

The thermo-moulding machine can be operated plug assisted, where complex forms or surface textures are required in the finished texture modified product 1. A plug assisted machine uses a punch (or similar moulded form) to aid or assist in the stretching of the lining material to take the form of the mould. The plug can be formed to provide co-operating fine detail to that of the mould recess 22. The plug is pressed into the lining 24, to allow the lining 24 to take the shape of the mould recess 22 with the assistance of the plug and a vacuum. The plug is then removed to allow for the introduction of the paste 32, which can then take on the complex form of the recess 22. This allows for very detailed textures in the finished product, for example, grains on the surface of rice, lines on the surface of pasta or crumbs-shapes on the edges of a bread roll.

Although not illustrated, it is contemplated that the paste 32 can be injection moulded into the mould recess 22. Alternatively, the lining material 24 can be blow moulded to form individual moulds for receiving the paste wherein the paste is injected or inserted into the moulded lining material 24 before the lining material 24 is sealed to form a package and subsequently frozen.

The lining material 24 can be made from a number of suitable sterile food grade films, including high barrier laminated films, made from Polyvinyl chloride (PVC), Nylon and Polyethylene terephthalate (PETE or PET).

A thermo-former (or vacuum forming machine) relies on extracting vented air out a single hole or a row of horizontal holes along the base 21 of the die 20. Due to the complexity of the desired die in this invention, evenly spaced holes along the base 21 were found to produce an uneven vacuum across the geometry of the recess 22 where the film or lining material 24 was not fully conforming to the shape and form of the moulding recess 22. The addition of supplementary air passages 35 through the die 20 and die base 21 allow the vacuum across the surface of the recess 22 to be tailored, resulting in the lining material 24 and subsequently the paste 32 conforming more closely to the shape of the moulding recess 22.

The air passages 34 and supplementary passages 35 are formed at various angles through the die base 21, to draw the lining material 24 against the moulding recess 22 at a 90-degree angle to the surface 28 (illustrated in FIG. 15A and FIG. 15B).

Figures 10A, 10B, 10C:
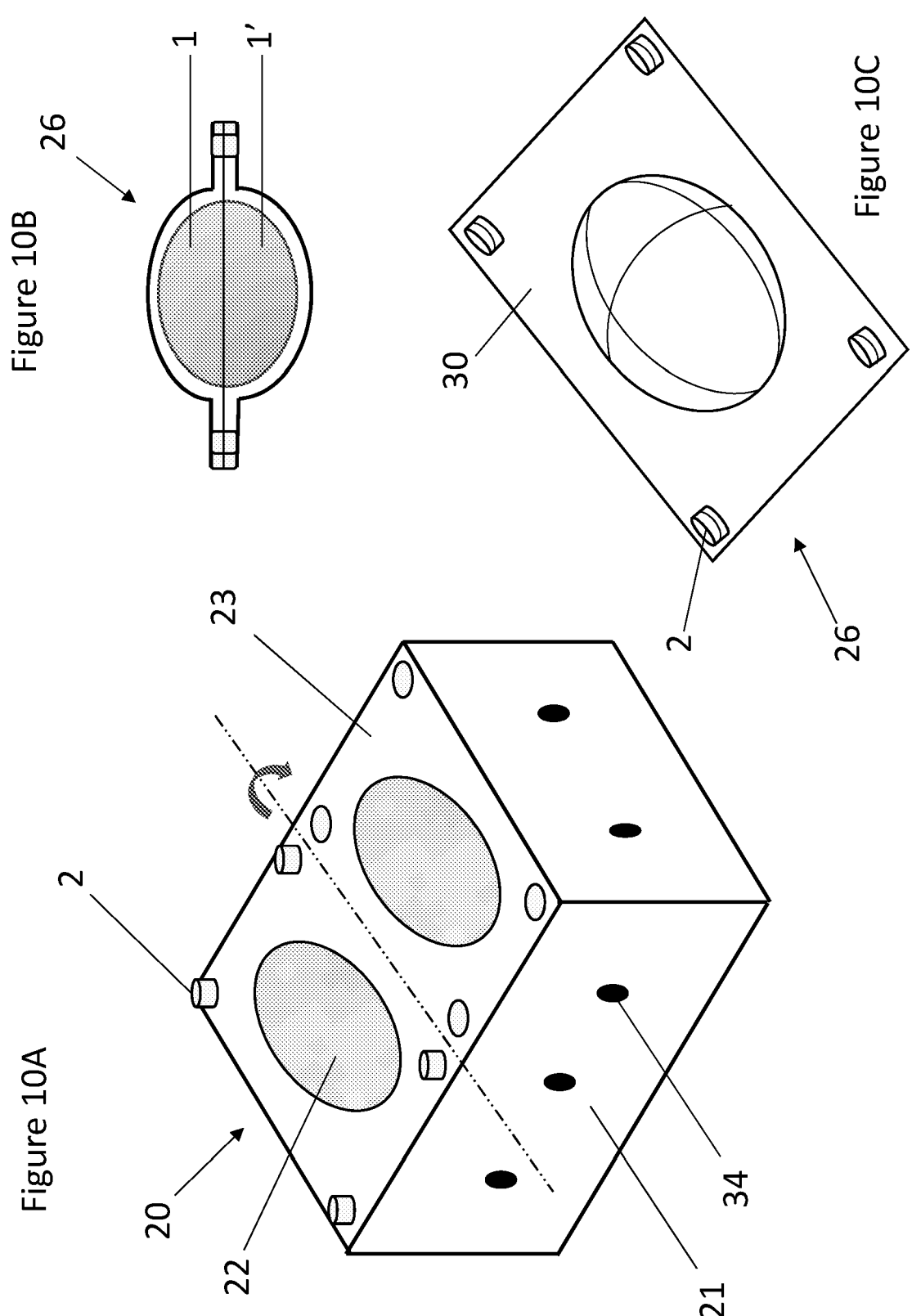
FIG. 10A is a perspective view of a die for forming two three-dimensional, flat bottomed starch products formed to resemble bread rolls.
FIG. 10B is an end view of a packaged, three-dimensional starch-based product.
FIG. 10C is a perspective view of the packaged product of FIG. 10B, which can be frozen and stored before being removed from the package and heated for consumption.

In some embodiments a second upper mould is also inserted into the thermo-forming machine so that a two-sided moulded starch-based product can be created, illustrated in the cross-sectional view of FIG. 10B and FIG. 10C. The paste 32 is injected (not illustrated) into the recess formed between the two sides of the mould after the vacuum is applied to draw the upper 25 and lower 24 lining materials against the recess surfaces.

Additional air passages through the base 21 into the recess 22 will increase the vacuum and assist in pulling the lining 24, 25 into any tightly contoured forms of the recess 22. This is particularly useful where the recess 22 is deep or complex in form.

For ease of packaging, the lining material 24 can be selected to also be a packaging material for the finished texture modified food product 1. This has the added benefit of reducing head space (and trapped air) within the package product thereby improving protection of the starch-based product from freezer burn. This is of importance as texture modified starch-based products are more susceptible to freezer burn than a natural frozen product due to the chemical changes in the cellular structure of the starch-based product during processing. To this end, a second layer of lining material 25, of the same or a different material, can be placed over the recess 22 after the recess 22 has been filled. The upper lining material 25 and lower lining material 24 can then be sealed to one another to form a pouch or package 30 for a single serve 26 of the product 1, illustrated in FIG. 100. The upper 25 and lower lining material 24 can be sealed together by heat forming a single-use sea; or formed to provide closing tabs 2 that can provide a re-usable seal.

The texture modified food product 1 can also be formed and packaged in a multi-pack 27 as illustrated in FIG. 11D. The multi-pack 27 can be perforated 29 or otherwise separable, to allow a single or multi-serve of the food product 1 to be selected and prepared for consumption. The remaining, unused serves of the multi-pack 27 can be returned to freezer storage or cold storage for use at a later time.

The finished packaged food product can be air evacuated prior to sealing the package 30. In some embodiments the package 30 is back flushed with carbon dioxide and nitrogen to remove suspended oxygen from the moulded starch-based product 1.

Additionally, the sealed evacuated package can be pasteurised to increase usable shelf life of the packaged product. Pasteurising the sealed product significantly reduces the microbial count of the texture modified food product 1. In many countries, nominated vulnerable groups e.g. hospital patients, aged care residents etc. will have standards for "ready-to-eat" products, particularly proteins which are the highest risk products. Duration and temperature of the pasteurisation process can be tailored to meet the required national standards, as required.

In some embodiments, the sealed evacuated package 30 can be high pressure processed (HPP also referred to as Pascalisation). While effectively reducing the microbial count of the food and destroying pathogens, the HPP process has minimal effect on the colour, flavour or vitamin content in the protein-based food product, unlike traditional pasteurisation techniques, where the heat from the pasteurisation process can discolour some foods and alter flavour and nutrients therein.

HPP is effectively a cold pasteurization technique, where the sealed evacuated package 30 is exposed to a high level of hydrostatic pressure, up to 600 MPa, for a few seconds to a few minutes. The high level of pressure exerted by the water surrounding the sealed package effectively inactivates certain microorganisms and enzymes in food, without the application of heat.

The standard for killing bacteria in high protein foods is very high and some form of cooking process will always be required for these high protein foods to achieve the required safety standards.

In Victoria, Australia, the government has a food business classification system, in which the class 1 service sector encompasses food businesses that provide meals to patients in: hospitals, hospices, child services, vulnerable persons, meal delivery organisations, nursing services, and aged persons. The texture modified food products 1 described herein are manufactured to conform to these requirements under the Food Act 1984.

FANZA provides standards for ready to eat products in a class 1 (any nominated vulnerable group e.g. hospital patients, aged care residents). Pasteurisation will extend the product's shelf life under refrigeration.

The paste 32 can be deposited into the mould 20 in a chilled state. However, where the recess 22 is a complex form, warming the paste 32 prior to introducing the paste into the mould can assist in filling the mould recess and reducing voids and air bubbles in the finished food product 1. To speed up the setting time of the paste 32 the mould 20 can be chilled such that contact with the mould starts the paste 32 setting on contact.

The mould can be manufactured to provide one or more than one recess, shaped to conform to a generic serve of the starch-based product selected to form the paste.

The shape of the desired product and size of thermo-former used will limit the available options for design of the die or mould.

Where the mould provides a plurality of shaped recesses 22, each of the plurality of shaped recesses being configured to set the starch-based t paste into a form of the generic serving of the starch-based product selected to form the paste. Each of the plurality of shaped recesses has an equal volume. The shaped recesses are sized for small portions between 90 g-120 g, and preferably about 100 g, as too much food can be off-putting or overwhelming to the consumer with dysphagia. The texture modified food product 1 is formed and set in the approximately 100 g portions, wherein additional texture modified vegetables can be added to modify the portions sizes between small and large meals. The home and community care (HACC) standards recommend cooked portions sizes of between 90 g-100 g for cooked protein. These standardised portions can easily be configured to cater for changes in appetite of the consumer and makes for a more realistic appearance of the finished texture modified meal.

After the sealed pouch 30 is pasteurised, hot or cold, it is rapidly chilled such as in a blast chiller and then frozen. The frozen product facilitates storage, handling and plating of the texture modified food 1, prior to heating and serving. While heating of the finished food product is initially carried out immediately prior to serving and consumption of the product, as the starch-based product retains its shape through the heating process, the starch-based product can be reheated during a meal session as feeding times can be slow for these consumers and the product may cool faster than their rate of consumption. Not all texture modified food products will require heating and some starch-based can be simply thawed and served, without heating eg. Bread rolls and pastries.

The finished package 30, once frozen, reduces contamination from food handling as the product stays in the finished package, provides for an increased shelf-life and facilitates ease of transport and distribution.

For some starch-based, the paste 32 requires additives to help the paste retain or acquire the required consistency and flow characteristics. These additives may assist in the overall forming of the texture modified food product 1 and can also assist with product form retention during heating of the thawed food product 1.

Any required additives are introduced into the paste 32 prior to setting the paste in the die 20. As different starch-based food products have different moisture levels, a small amount of vegetable fibre can assist with giving back structure to the paste 32 without changing the smoothness of the paste 32 required to meet the proposed international standard or changing the flavour profile of the paste 32. Gelatin can also be used to add structure back to the paste 32.

For some starch-based food products, a fibre content in the paste of between 1-5% is sufficient to achieve the required structure. Preferably about 3% of vegetable fibre is added to the paste 32.

The Xanthan gum can prevent some bleeding of liquid from the food product 1 while defrosting. The Xanthan gum helps the paste 32 retain moisture and thereby prevent the starch-based product 1 from drying out. A Xanthan gum content of between 0.1-0.6% is sufficient to reduce bleeding of liquids.

Agglomerated modified potato starch (AMPS) can also be added to the paste 32 to help assist the starch-based product in retaining its shape when being heated for service. Both AMPS and Xanthan gum give the paste 32 a mousse-like texture and inhibit the moulded food product 1 structure from losing its form when heated. An AMPS content of between 1.0-3.0% is sufficient to retain the products shape through a heating process. Preferably about 2.5% of AMPS is added to the paste 32.

The AMPS can be directly added to the paste 32 and will evenly distribute therethrough. Additional AMPS will naturally thicken the paste 32 and does not require the addition of heat to do so. The addition of AMPS until now has been avoided as thickening of the paste 32 would appear contrary to the process of producing the puree. However, through trial and experimentation it was found that the relevant standards can be achieved, and the starch-based product can still retain sufficient structure to hold its shape and form, through a heating process.

During pasteurising there is some tendency for water to leach out of the starch-based food product in the moulded pack, leaving the texture modified food dry and/or grainy. The addition of AMPS and Xanthan Gum can reduce this issue.

The additives are selected from at least one of: Xanthan gum; Carrageenan; Agar-Agar; Guar Gum; Gum Arabic; Gelatine; salt; pepper; modified potato starch; agglomerated modified potato starch (AMPS); natural vegetable fibre; and bamboo fibre. However, a combination of additives including a ratio percentage of Xanthan gum (XG), was found to provide the required consistency in the paste 32.

The texture modified food product 1 provides a nutrient rich food that can be eaten and digested by people suffering from dysphagia. Aside from retaining minerals and vitamins present in the starch-based products from which the paste is formed, the processing method described herein retains the natural colours and flavour profiles of the selected starch-based food product.

Unlike more traditional pureeing processes, using a blender to puree food that would require large quantities of additional liquids to puree the product, the paste 32 described herein does not include large quantities of additional water, thus the nutrient levels of the finished starch-based food product 1 are higher than currently available puree products.

Minimal additives into the paste, prior to setting, allows the texture modified food product to be frozen, transported, defrosted and heated, while retaining the desired shape of the selected serving of starch-based food product.

The individual, microwavable, portions allow for balancing and monitoring meals simply and in a convenient manner while also facilitating easy variation for loss or increase in appetite. It is contemplated that a facility can maintain a supply of starch-based products, all in pre-portioned packs, such that a consumer can select any desired combination of starch, protein and vegetable texture modified food products to form a complete meal. It is further contemplated that pre-assembled complete meals can be assembled and packaged and sold as convenience meals. For hospitals, and aged care facilities, this can bring a much-needed flexibility to their catering operation. All texture modified food products 1 are prepared to the predetermined standard and can be delivered and stored in bulk. With minimal work, individual plates of food can be made up to an individual's preference from the frozen food products 1, providing nutritious and varied modified texture meals.

The starch-based product 1 is selectively heated prior to consumption, unless it is a starch-based product to be served cold that merely requires thawing before consumption.

As the starch-based product 1 can be sensitive to moisture loss when heated, the starch-based product 1 should be covered when heated.

While the starch-based product 1 can be steamed or microwaved, it is also configured to be passed through a banqueting system, or other heated trolley systems such as Berlodge™, Regethermic™ or Rational™ carts. These methods are suitable for high volume catering and are used in some hospitals and aged care facilities.

A typical banqueting system has a heating cycle of about 9-12 minutes at temperatures of about 120° Celsius. Banqueting systems are used to heat the starch-based product 1 once arranged on a plate. The Banqueting system heats the plate and the texture modified food product together, and the hot plate continues to heat the tmf product after the plate is removed from the system. Due to the timing and temperatures used in a banqueting system the starch-based product 1 will not change colour, flavour or form because of this process, thereby preserving the visually appealing colour, taste, shape and nutritional value of the packed tmf product 1 as supplied.

Dressing a Texture Modified Food Product

To further create a visually appealing modified texture food product and better resemble the look and flavour of a non-tmf starch-based product a dressing or coating 33 can be added to the tmf product. For example, a sushi hand roll product can be coated with a powdered seaweed to better resemble a traditional hand roll (illustrated in FIG. 4).

Alternatively, a coating 33 from bread, can be used to intensify the flavour profile of a starch-based food product.

The coating 33 made from bread starts with thinly sliced or shredded bread. The bread may then be cooked in either an oven or a deep fryer (and the like) to achieve the desired coating colour, flavour profile and moisture content (ie. cooked to crisp).

Coating mixture is then removed from the cooking appliance to cool. During the cooling period, excess oil is drained or spun from the fried bread pieces.

The salted or unsalted fried bread pieces are then broken down into a fine powder. This can be achieved using a bowl cutter, a food processor, a shearing mill or a mill stone. The resulting fine powder has a sheen, making it appear damp, from the oil content therein. If the coating mixture clumps, a puffed rice powder may be added to aid separation and give a loamy texture.

The coating mixture can be additionally flavoured, for example, by adding dry turmeric powder and dried sweet paprika powder, to about 0.5% weight. These spices are merely examples, and any number of spices and herbs can be added to the coating mixture to achieve a range of coatings 33 providing different flavour profiles. An acid can also be introduced into the coating to produce a salt and vinegar flavour profile.

The coating 33 can also be made from other starches that are not hydrophobic, for example a rice starch. The rice-based coating can provide colour and flavour profiles whereas the bread-based coating provides a darker colour and a distinctive flavour profile.

Any combination of herbs and spices can be added to the coating 33 for different flavours and appearances.

To apply the coating 33, the starch-based product is cut or formed into a desired end shape; for example, a bread roll or a sushi roll. The texture modified starch-based products can then be allowed to thaw before coating.

A fine spray or mist of water or salt water can be applied to the surface of the texture modified food product to soften the surface and facilitate better adhesion of the coating 33. The tmf product can be dusted, or rolled in the coating 33, as desired.

The coated tmf product is left for about an hour, to allow the water mist and exterior surface water on the tmf product to be absorbed into the coating, softening it, and ensuring that the required tmf standards are met by the coated tmf product 1.

The coated tmf product is then heated ready for service. At which time the heating of the product adheres the coating 33 to the food product 1 and provides additional colour, flavour and texture to the texture modified food product 1 when served.

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the example methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

| LEGEND | |
| --- | --- |
| No. | |
| 1 | Texture modified food product |
| 2 | Closing tab |
| 3 | Texture modified rice product |
| 4 | Rice texture |
| 5 | Seam |
| 6 | Texture modified meat product |
| 7 | Chicken rice meal |
| 8 | Texture modified carrot product |
| 9 | Texture modified fish product |
| 10 | Texture modified potato product |
| 11 | Texture modified vegetable |
| 12 | Stir-fry meal |
| 13 | Texture modified broccoli |
| 14 | Texture modified pasta product |
| 15 | Texture modified sushi |
| 16 | Texture modified bread product |
| 17 | Pasta shell striation texture |
| 18 | Texture modified noodle product |
| 19 | Gravy (viscosity modifier) |
| 20 | Die |
| 21 | Base |
| 22 | Moulding recess |
| 23 | Die top surface |
| 24 | Lower liner layer |
| 25 | Upper liner layer |
| 26 | Individually packaged products |

-continued

| LEGEND |  |
| --- | --- |
| No. |  |
| 27 | Multi-pack product |
| 28 | Surface of recess |
| 29 | Perforation lines |
| 30 | Packaging |
| 31 | Second surface of recess |
| 32 | Texture modified food paste |
| 33 | Coating |
| 34 | Air passage |
| 35 | Supplementary air passage |
| 36 | Pasta and sauce meal |
| 37 | Noodle soup dish |

The invention claimed is:

1. A method of preparing a texture modified starch-based food product for consumption by a dysphagic consumer, comprising the steps:
   (a) dehydrating a selected starch-based food to remove excess water;
   (b) grinding the dehydrated starch-based food to form a powder;
   (c) adding a carrier to coat the powder;
   (d) rehydrating the powder coated in (c) to form a paste; and
   (e) setting the paste in a mould to form the paste into the texture modified starch-based food product, with at least a portion of the mould being shaped and textured to impart a representative three-dimensional shape and surface texture that visually resembles an original form of the selected starch-based food, wherein the texture modified starch-based food product contains no lumps requiring chewing by the dysphagic consumer.

2. The method of claim 1, wherein the carrier of step (c) is an oil, and the coated powder is a roux formed from the oil and the powder, the roux being combinable with water at a temperature of 10° C. or less to form a homogeneous mixture.

3. The method of claim 1, wherein the starch-based product is cooked prior to dehydrating in step (a).

4. The method of claim 1, wherein the step of grinding the dehydrated starch-based food is performed with a grinding mill or a bowl cutter.

5. The method of claim 1, wherein the ratio of weight of powder to the weight of the carrier is about 10:3.

6. The method of claim 1, further comprising the step of adjusting the consistency of the paste prior to forming the paste into the representative three-dimensional shape and surface texture of the selected starch-based product, wherein the step of adjusting the paste changes the viscosity of the paste such that the texture modified food product retains the moulded shape and texture through a thawing or heating process in which the food product is subjected to steaming, to microwaving, to heating in a banqueting system, or to a combination thereof.

7. The method of claim 1, further comprising the step of introducing an additive into the paste prior to or during forming the paste.

8. The method of claim 1, further comprising the step of integrating the mould with a thermoforming machine.

9. The method of claim 1, wherein the mould provides a recess shaped and/or textured to form the paste to the representative three-dimensional shape and surface texture of the selected starch-based food product.

10. The method of claim 9, wherein the mould provides a plurality of recesses shaped and/or textured to form the paste to the representative three-dimensional shape and surface texture of the selected starch-based food product.

11. The method of claim 1, further comprising a step of lining the mould with a first layer of packaging material prior to introducing the paste therein.

12. The method of claim 11, including vacuum assisted drawing of the first layer of packaging material into the mould prior to receiving the paste.

13. The method of claim 11, further comprising the step of disposing a second layer of packaging material over the mould after the paste has been received therein and fusing the second layer with the first layer of packaging material thereby forming a sealed pouch around the moulded texture modified food product.

14. The method of claim 13, further comprising the step of cold pasteurising or hot pasteurising the sealed pouch to increase usable shelf life of the packaged product.

15. The method of claim 13, further comprising the step of freezing the sealed pouch for distribution.

16. The method of claim 1, wherein the powder consists of particles of the dehydrated starch-based food having sizes from 5 microns to 40 microns with a flour-like consistency.

17. The method of claim 1, further comprising the step of adding xanthan gum, wherein the inclusion of xanthan gum retains liquids within the moulded texture modified food product.

18. The method of claim 2, wherein rehydrating the coated powder in step (d) comprises adding water to the coated powder at a temperature of 10° C. or less to the roux formed in step (c), and subsequently adding the xanthan gum at 0.1% to 0.6% by weight, whereby the addition of the xanthan gum at 0.1% to 0.6% by weight retains liquids within the moulded texture modified food product.

19. The method of claim 1, further comprising a step (f) dressing the texture modified food product by applying a coating to a surface of the texture modified food product.

20. The method of claim 19, wherein the coating is made from bread pieces that are broken down into a powder and step (f) further comprises spraying water onto the surface of the texture modified food product to soften the surface and facilitate adhesion of the coating to the texture modified food product.

21. The method of claim 6, wherein the thawing or heating process comprises heating in the banqueting system, and wherein the banqueting system has a heating cycle of about 9 minutes to about 12 minutes at a temperature of about 120° Celsius.

22. A method of preparing a texture modified starch-based food product for consumption by a dysphagic consumer, the method comprising:
   (a) dehydrating a selected starch-based food shape to remove excess water;
   (b) grinding the dehydrated starch-based food to form a powder consisting of particles of the dehydrated starch-based food product having particle sizes from 5 microns to 40 microns;
   (c) combining the powder with an oil at a weight ratio of powder to oil of about 10:3 to coat the particles and form a roux comprising the powder coated with the oil;
   (d) adding water to the roux at a temperature of 10° C. or less, to rehydrate powder and form a paste having no lumps, and subsequently adding xanthan gum to the paste at about 0.1% to 0.6% by weight; and
   (e) setting the paste in a mould to form the paste into the texture modified starch-based food product, wherein at least a portion of the mould is shaped and textured to impart a representative three-dimensional shape and surface texture that visually resembles an original shape of the selected starch-based food, and wherein the texture modified starch-based food product is non-sticky and contains no lumps requiring chewing by the dysphagic consumer.

5

\* \* \* \* \*